(12) United States Patent
Ito et al.

(10) Patent No.: US 7,408,720 B2
(45) Date of Patent: Aug. 5, 2008

(54) ZOOM LENS AND IMAGE PICKUP APPARATUS HAVING SAME

(75) Inventors: Daisuke Ito, Utsunomiya (JP); Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/689,041

(22) Filed: Mar. 21, 2007

(65) Prior Publication Data

US 2007/0229975 A1    Oct. 4, 2007

(30) Foreign Application Priority Data

Mar. 30, 2006   (JP)   ............... 2006-094282

(51) Int. Cl.
    *G02B 15/14*    (2006.01)
(52) U.S. Cl. ...................... 359/687; 359/686
(58) Field of Classification Search ................ 359/684, 359/685, 686, 687, 689
    See application file for complete search history.

(56) References Cited

U.S. PATENT DOCUMENTS

| 6,118,593 | A | 9/2000 | Tochigi | |
| 7,133,214 | B2* | 11/2006 | Hoshi | 359/687 |
| 7,199,942 | B2* | 4/2007 | Miyazawa | 359/687 |
| 7,245,442 | B2* | 7/2007 | Ohtake | 359/687 |
| 7,277,234 | B2* | 10/2007 | Hoshi | 359/687 |

FOREIGN PATENT DOCUMENTS

| JP | 2000-089116 | 3/2000 |
| JP | 2000-227548 | 8/2000 |
| JP | 2002-182109 | 6/2002 |
| JP | 2002-287027 | 10/2002 |

* cited by examiner

*Primary Examiner*—David N Spector
(74) *Attorney, Agent, or Firm*—Morgan & Finnegan LLP

(57) ABSTRACT

A zoom lens has a first lens unit having a positive refractive power, a second lens unit having a negative refractive power, which is moved during zooming, a third lens unit having a positive refractive power, and a fourth lens unit having a positive refractive power, which is moved during zooming, arranged in the mentioned order from the object side to the image side. The zoom lens satisfies the following conditions:

$$0.15 < |f2|/\sqrt{(fw \times ft)} < 0.27 \text{ and}$$

$$5.4021\, f3/fw < 10.00,$$

where f2 and f3 are the focal lengths of the second and third lens units respectively, and fw and ft are the focal lengths of the zoom lens at the wide angle end and the telephoto end respectively.

9 Claims, 15 Drawing Sheets

ZOOM LENS AND IMAGE PICKUP APPARATUS HAVING SAME

BACKGROUND OF THE INVENTION

1. Field of the Invention

The present invention relates to a zoom lens that is suitably used as a taking lens in an image pickup apparatus such as a video camera, a digital still camera, a broadcasting camera, a film camera and the like.

2. Description of the Related Art

There is a need for a zoom lens that is compact in size and has a high zoom ratio for use as a taking optical system in an image pickup apparatus using a solid state image pickup element, such as a video camera, a digital still camera and a film camera using a silver halide film.

As a zoom lens that meet such needs, a four-unit zoom lens having a first lens unit having a positive refractive power, a second lens unit having a negative refractive power, a third lens unit having a positive refractive power and a fourth lens unit having a positive refractive power arranged in the mentioned order from the object side to the image side has been known.

Some known four-unit zoom lenses having the above described configuration are what is called rear-focus zoom lenses in which the second lens unit is moved to change magnification and the fourth lens unit is moved to perform focusing and correction of image plane variations (see Japanese Patent Publication 2002-182109, Japanese Patent Application Laid-Open No. 2002-287027, U.S. Pat. No. 6,118,593 and Japanese patent Application Laid-Open No. 2000-227548).

In recent years, it is highly desired that zoom lenses used in image pickup apparatuses have a high zoom ratio and be small in the size of the entire lens system.

In a zoom lens, in general, increasing the refractive power of the lens units that constitute the zoom lens leads to a decrease in the movement amount of the magnification changing lens unit(s) in achieving a predetermined zoom ratio. Thus, it is possible to reduce the entire length of the lens system and increase the zoom ratio by increasing the refractive power of the lens units.

However, if the refractive power of each lens unit is simply increased, variations of aberrations during zooming become so large that it becomes difficult to achieve excellent optical performance throughout the entire zoom range, while making the zoom ratio higher.

On the other hand, use of the rear focus system leads to a reduction in the size of the entire lens system, enables high speed focusing and makes close-up shooting easy.

On the other hand, however, use of the rear focus system leads to an increase in aberration variations during focusing, and makes it very difficult to achieve excellent optical performance throughout the entire object distance range from a infinite object distance to a short object distance.

When the zoom ratio is to be made higher, it is difficult achieve excellent optical performance throughout the entire zoom range In view of the above, to achieve an increase in the zoom ratio and a reduction in the size of the entire lens system, it is important to appropriately design the zoom type, the refractive powers of the lens units, and the lens configurations of the lens units.

SUMMARY OF THE INVENTION

An object of the present invention is to provide a small size zoom lens having a high zoom ratio and having excellent optical performance throughout the entire zoom range, and to provide an image pickup apparatus equipped with such a zoom lens.

A zoom lens according to the present invention comprises, in the mentioned order from the object side to the image side, a first lens unit having a positive refractive power, a second lens unit having a negative refractive power, which is moved during zooming, a third lens unit having a positive refractive power, and a fourth lens unit having a positive refractive power, which is moved during zooming, wherein the zoom lens satisfies the following conditions:

$$0.15 < |f2|/\sqrt{(fw \times ft)} < 0.27 \text{ and}$$

$$5.40 < f3/fw < 10.00,$$

where f2 and f3 are the focal lengths of the second and third lens units respectively, and fw and ft are the focal lengths of the zoom lens at the wide angle end and the telephoto end respectively.

An image pickup apparatus according to the present invention comprises a solid state image pickup element, a zoom lens that forms an image on the solid state image pickup element, the zoom lens including, in the mentioned order from the object side to the image side a first lens unit having a positive refractive power, a second lens unit having a negative refractive power, which is moved during zooming, a third lens unit having a positive refractive power, and a fourth lens unit having a positive refractive power, which is moved during zooming, wherein the zoom lens satisfies the following conditions:

$$0.15 < |f2|/\sqrt{(fw \times ft)} < 0.27 \text{ and}$$

$$5.40 < f3/fw < 10.00,$$

where f2 and f3 are focal lengths of the second and third lens units respectively, and fw and ft are the focal lengths of the zoom lens at the wide angle end and the telephoto end respectively.

Further features of the present invention will become apparent from the following description of exemplary embodiments with reference to the attached drawings.

Figure 1:
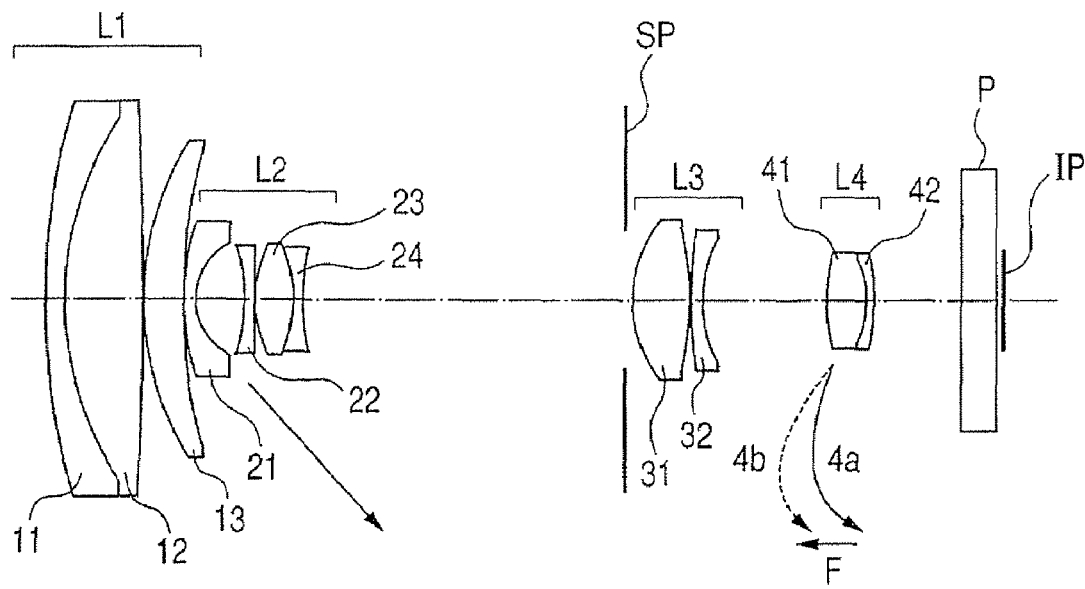
FIG. 1 is a cross sectional view of a zoom lens according to a first embodiment of the present invention at the wide angle end.
Figure 2:
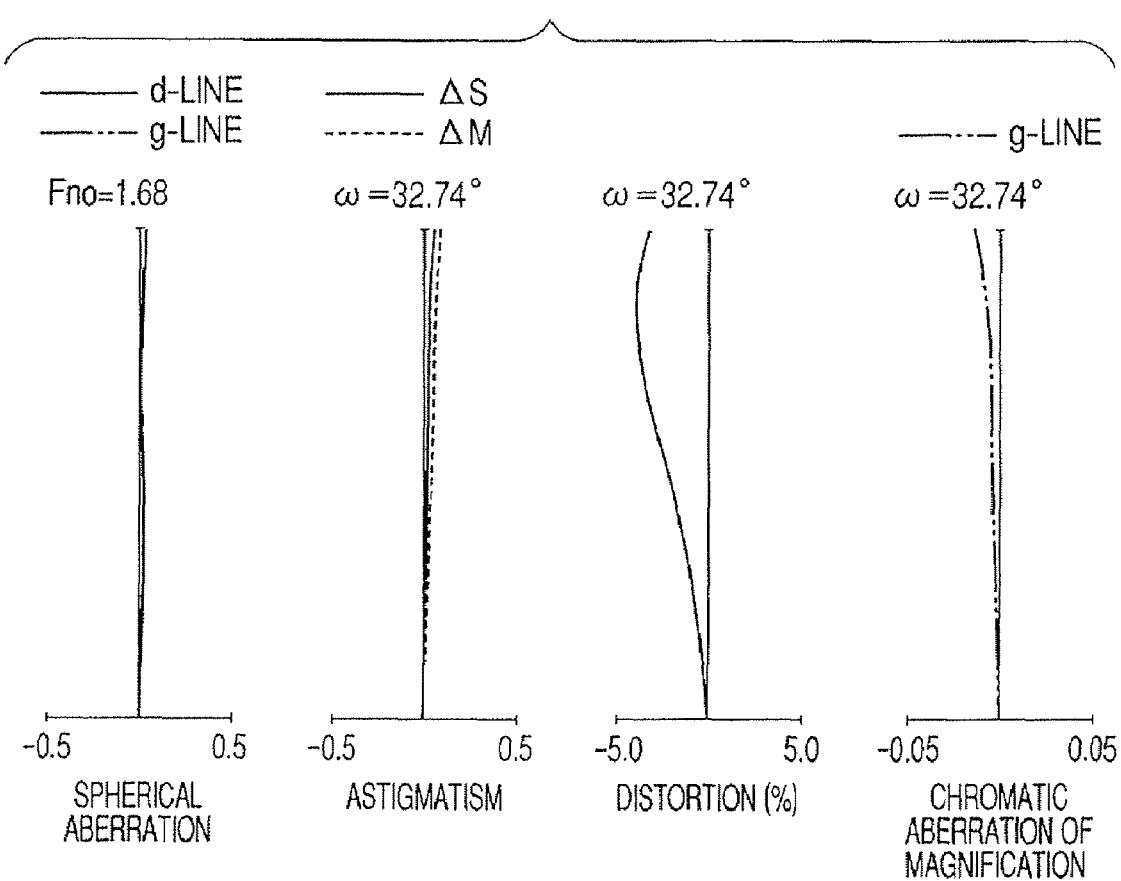
FIG. 2 illustrates aberrations of the zoom lens according to the first embodiment at the wide angle end.
Figure 3:
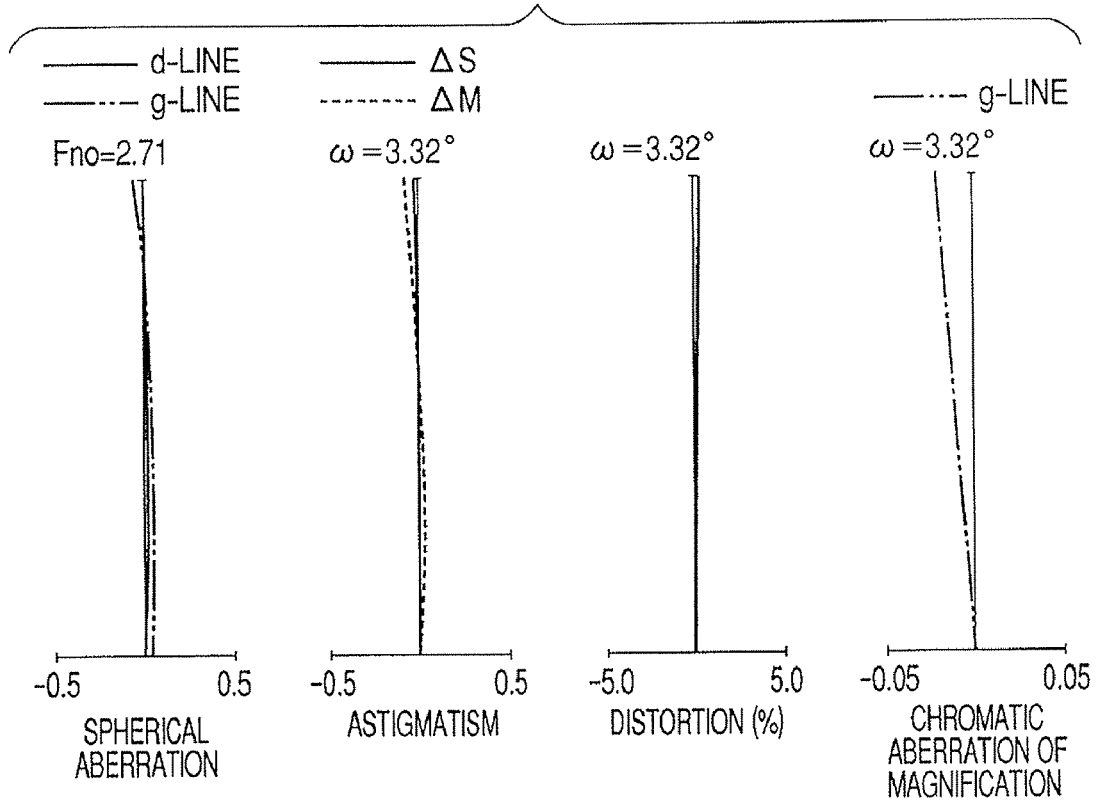
FIG. 3 illustrates aberrations of the zoom lens according to the first embodiment at an intermediate zoom position.
Figure 4:
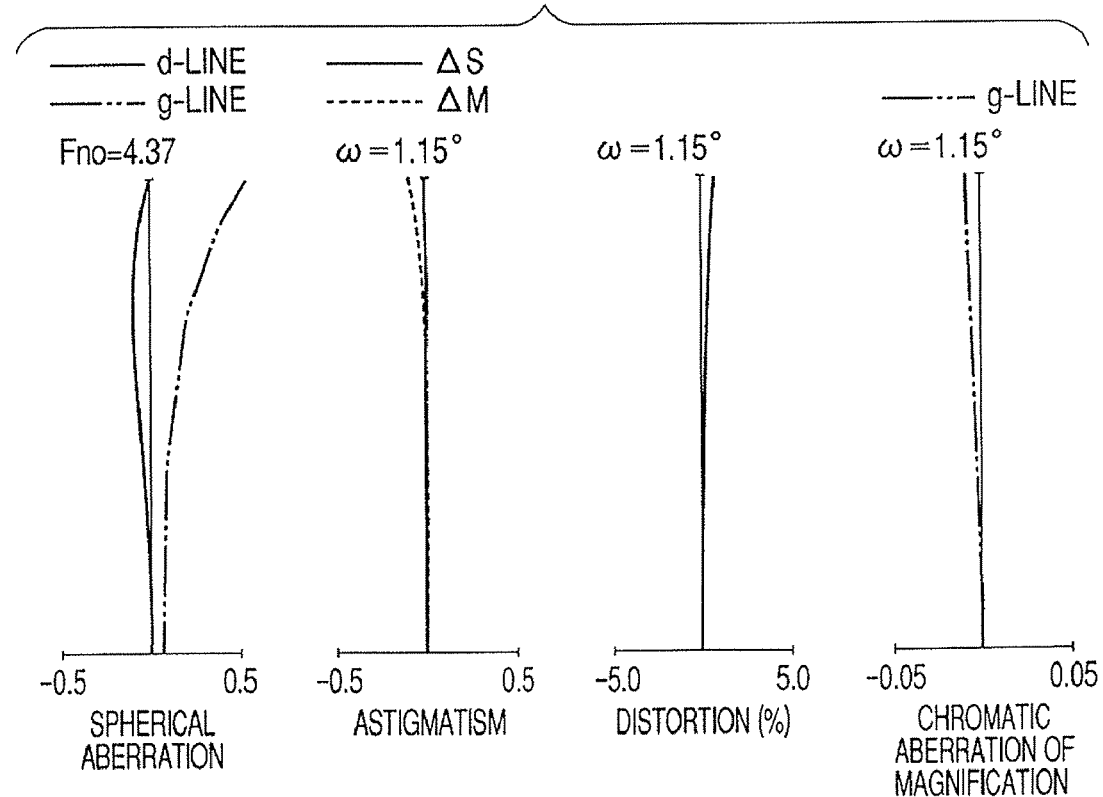
FIG. 4 illustrates aberrations of the zoom lens according to the first embodiment at the telephoto end.

The zoom lenses according to the embodiments are taking lens systems for use in image pickup apparatuses. In the cross sectional views of the lenses, the object side (or the front) is shown in the left and the image side (or the rear) is shown in the right.

When the zoom lenses according to the embodiments are used as projection lenses of projectors or the like, the screen is set on the left and an image to be projected is set on the right in the cross sectional views. Each of the zoom lenses illustrated in the cross sectional views includes the first lens unit L1 having a positive refractive power (i.e. the optical power, equivalent to the inverse of the focal length), the second lens unit L2 having a negative refractive power, the third lens unit L3 having a positive refractive power, and the fourth lens unit L4 having a positive refractive power. The zoom lens also has an aperture stop SP disposed on the object side of the third lens unit L3.

In addition, the zoom lens also includes an optical block P such as an optical filter, or a face plate.

When the zoom lens is used as a taking optical system of a video camera or a digital still camera, the image plane IP corresponds to the image surface of a solid state image pickup element (or a photoelectric conversion element) such as a CCD sensor or a CMOS sensor. When the zoom lens is used as a taking optical system of a film camera, the image plane IP corresponds to the film surface.

In the aberration diagrams are shown curves for the d-line and g-line (designated by "d" and "g") and the meridional image plane ΔM and the sagittal image plane ΔS. The magnification chromatic aberrations are shown for the g-line.

In the following description of the embodiments, the wide angle end zoom position and the telephoto end zoom position refer to the zoom positions at the time when the lens unit for changing the magnification (that is, the second lens unit L2 in the embodiments) is at the ends of the range over which that lens unit can move mechanically along the optical axis.

In all the embodiments, during zooming from the wide angle end to the telephoto end, the second lens unit L2 is moved toward the image side to change the magnification as illustrated by an arrow in each cross sectional view, and the fourth lens unit L4 is moved in a way represented by an arrow (in the cross sectional view) that is convex toward the object side to correct image plane variations caused upon changing the magnification.

The zoom lenses according to the embodiments are rear focus systems in which focusing is performed by moving the fourth lens unit L4 along the optical axis. The curved arrow 4a drawn by the solid line and the curved arrow 4b drawn by the broken line in each cross sectional view represent the movements of the fourth lens unit L4, with which image plane variations upon changing the magnification are corrected, respectively in the state in which the lens is focused on an object at infinity and in the state in which the lens is focused on an object at a short distance. In this way, the fourth lens unit L4 is moved in a way represented by an arrow that is convex toward the object side, whereby the air space between the third lens unit L3 and the fourth lens unit L4 is efficiently used and a reduction in the entire length of the zoom lens is advantageously achieved.

During focusing operation from an object at infinity to an object at a short distance at the telephoto end, the fourth lens unit L4 is moved frontward as indicated by arrow F.

The first lens unit L1, the third lens unit L3 and the aperture stop SP are not moved along the optical axis during zooming or focusing. However they may be moved, if need be, to correct aberrations.

In the following, the lens configurations in each of the embodiments will be described. In the following description, lenses and other components of the zoom lens will be described in the order of their arrangement from the object side to the image side, unless specified otherwise.

The first lens unit L1 includes a cemented lens composed of a negative lens 11 having a meniscus shape with the convex side facing the object side and a positive lens 12, and a positive lens 13 having a meniscus shape with the convex surface facing the object side.

Figure 5:
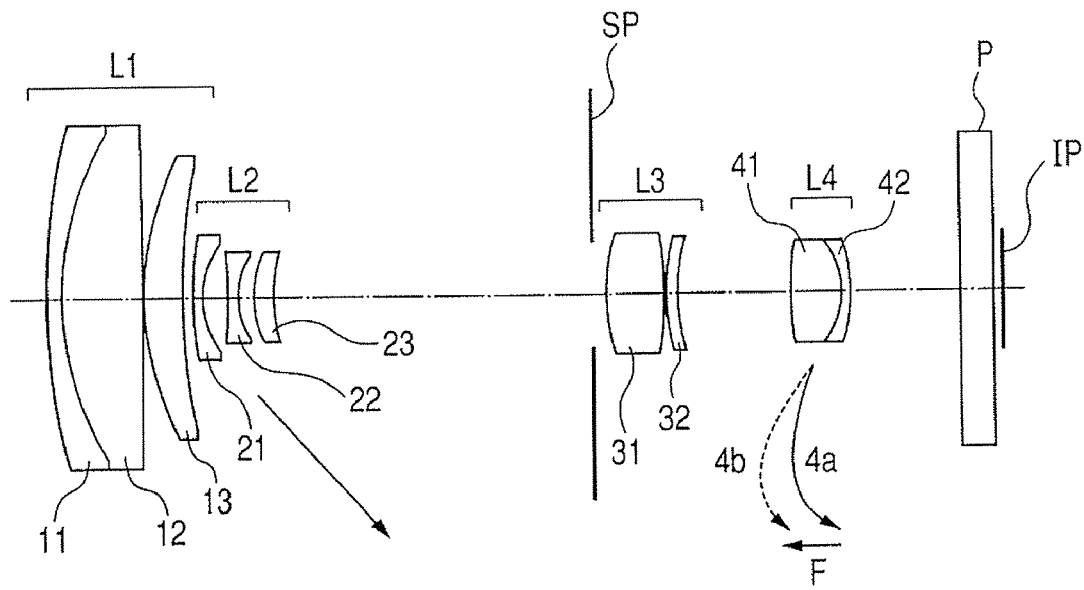
FIG. 5 is a cross sectional view of a zoom lens according to a second embodiment of the present invention at the wide angle end.
Figure 6:
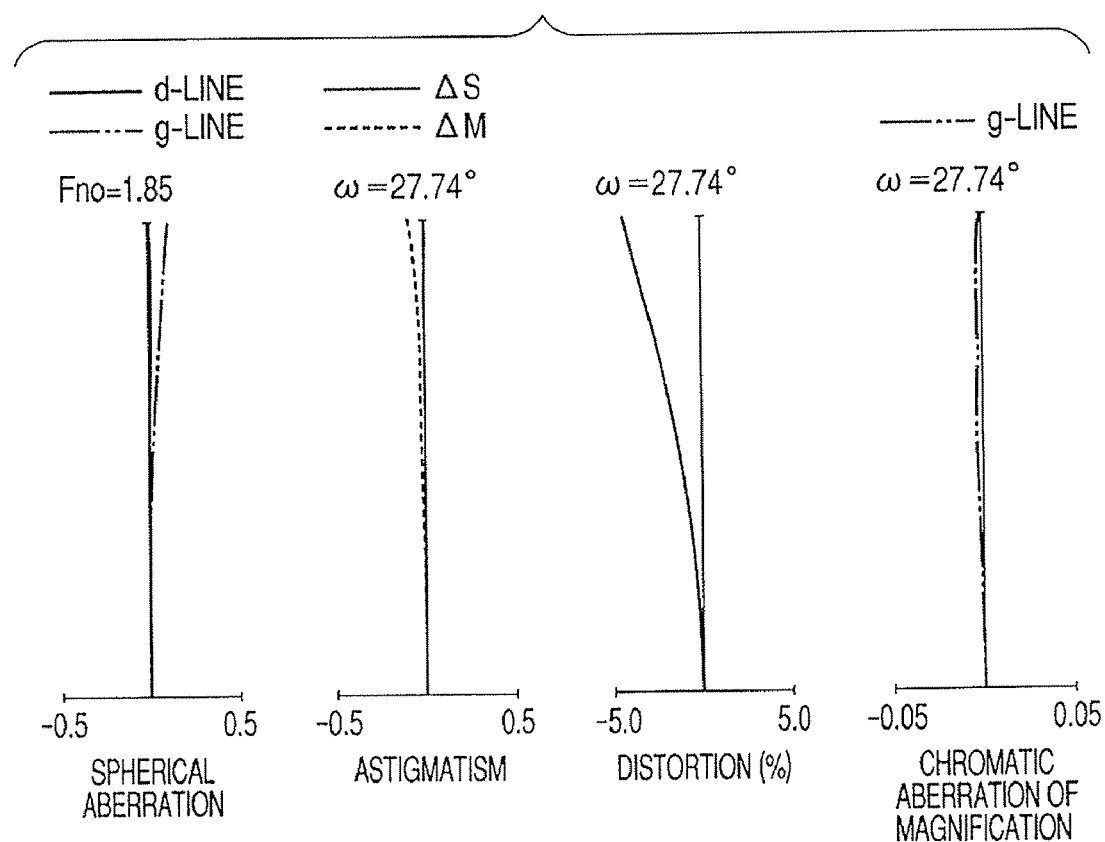
FIG. 6 illustrates aberrations of the zoom lens according to the second embodiment at the wide angle end.
Figure 7:
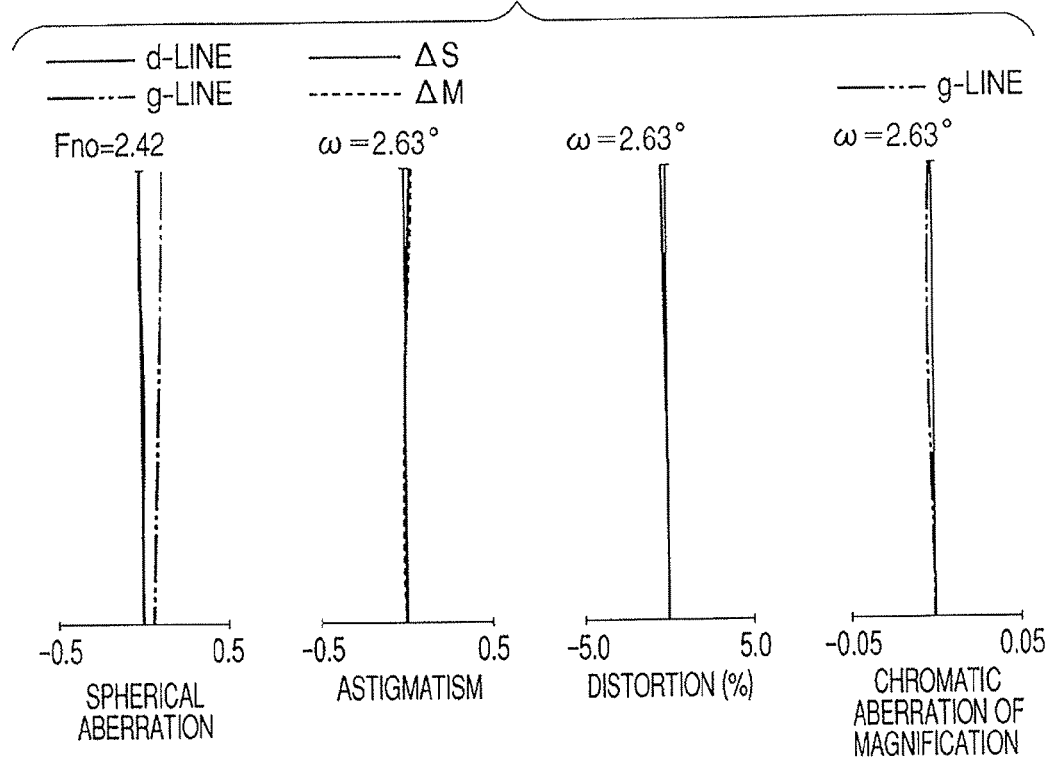
FIG. 7 illustrates aberrations of the zoom lens according to the second embodiment at an intermediate zoom position.
Figure 8:
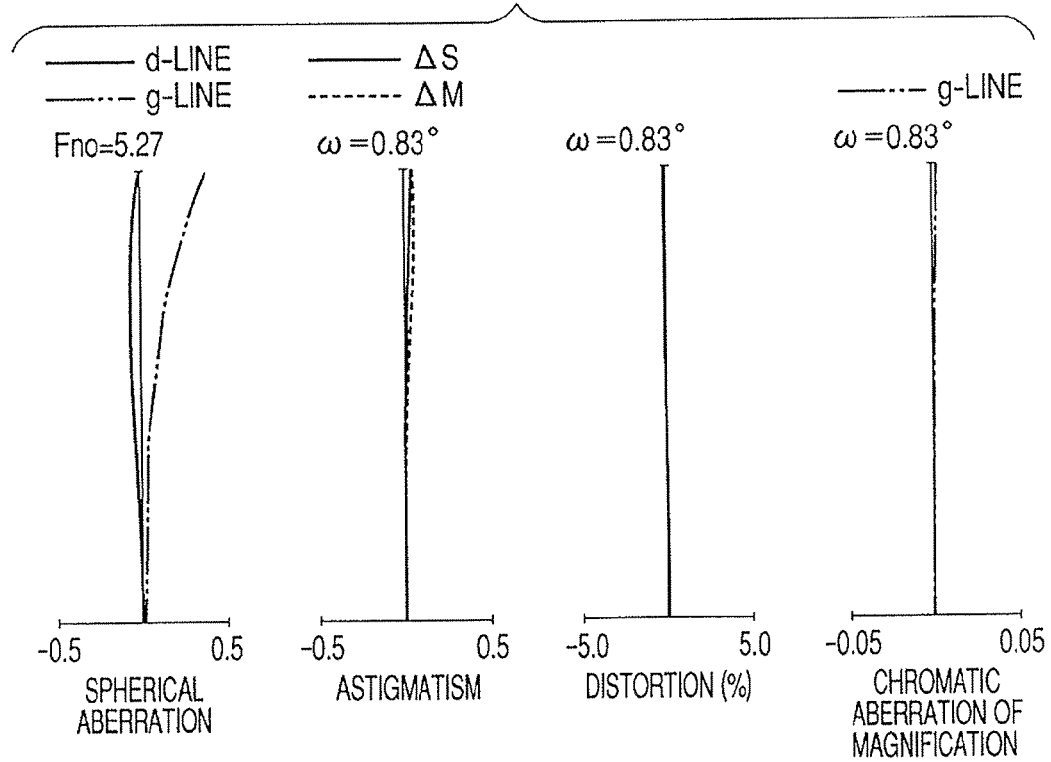
FIG. 8 illustrates aberrations of the zoom lens according to the second embodiment at the telephoto end.
Figure 9:
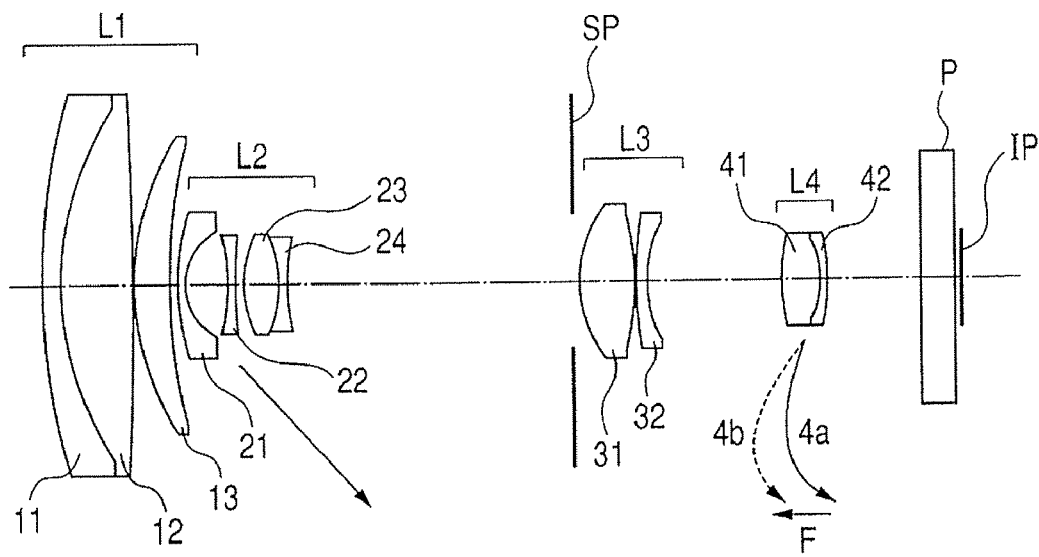
FIG. 9 is a cross sectional view of a zoom lens according to a third embodiment of the present invention at the wide angle end.
Figure 10:
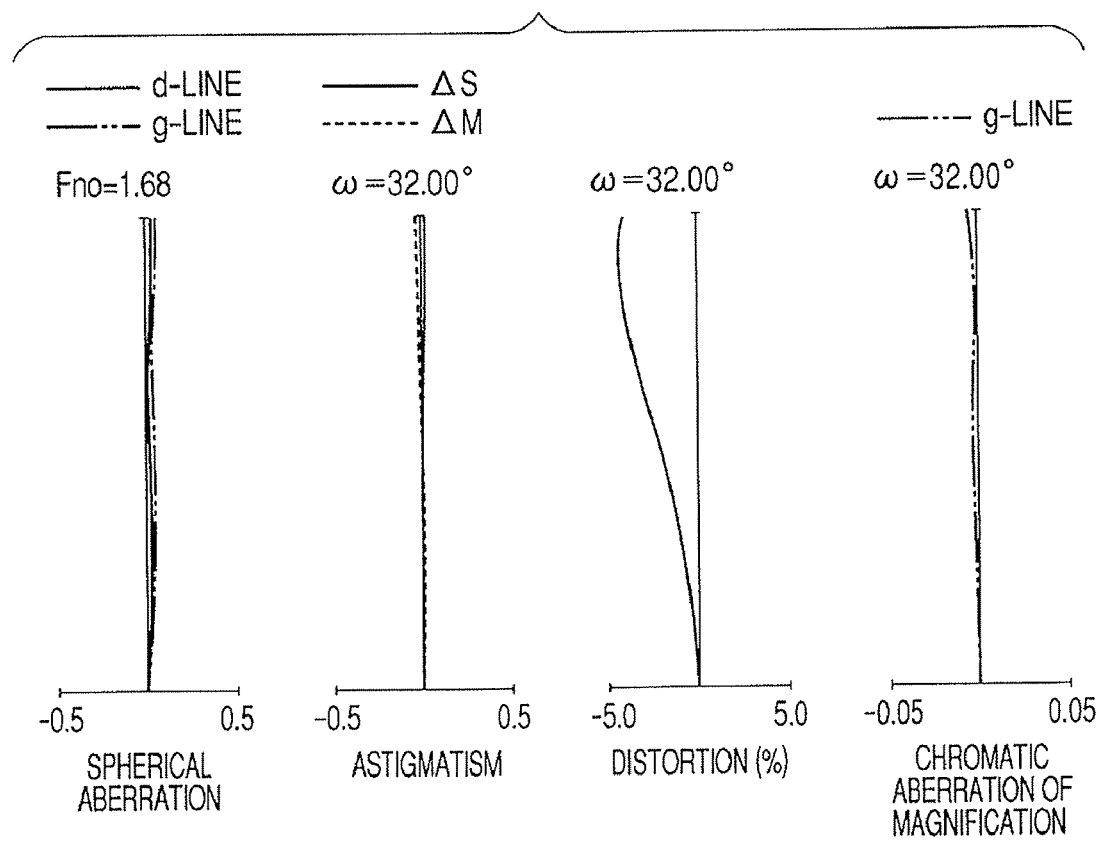
FIGS. 10, 11 and 12 illustrate aberrations of the zoom lens according to the third embodiment respectively at the wide angle end, at an intermediate zoom position, and at the telephoto end.
Figure 11:
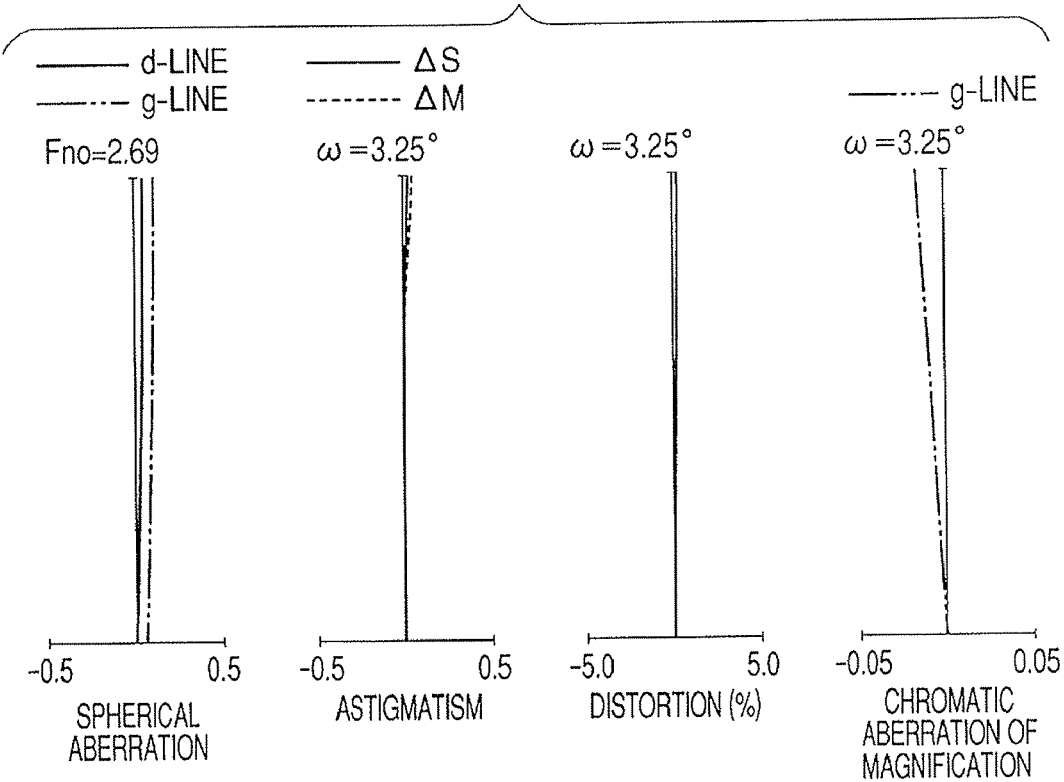
Figure 12:
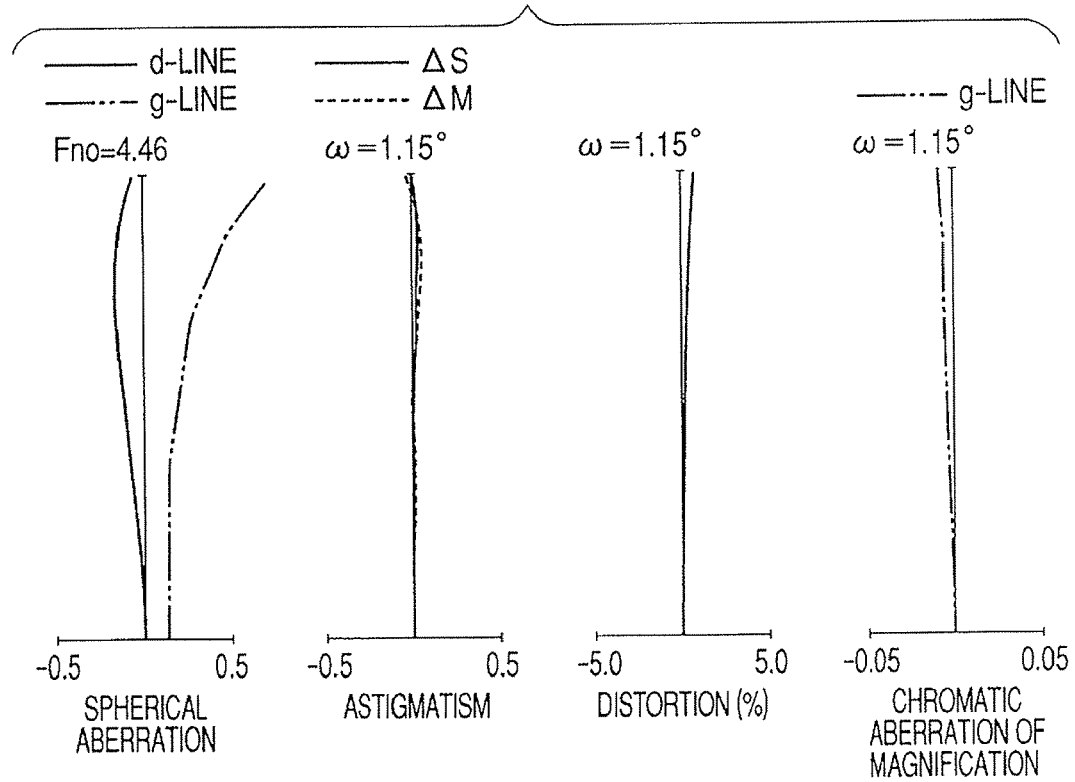
Figure 13:
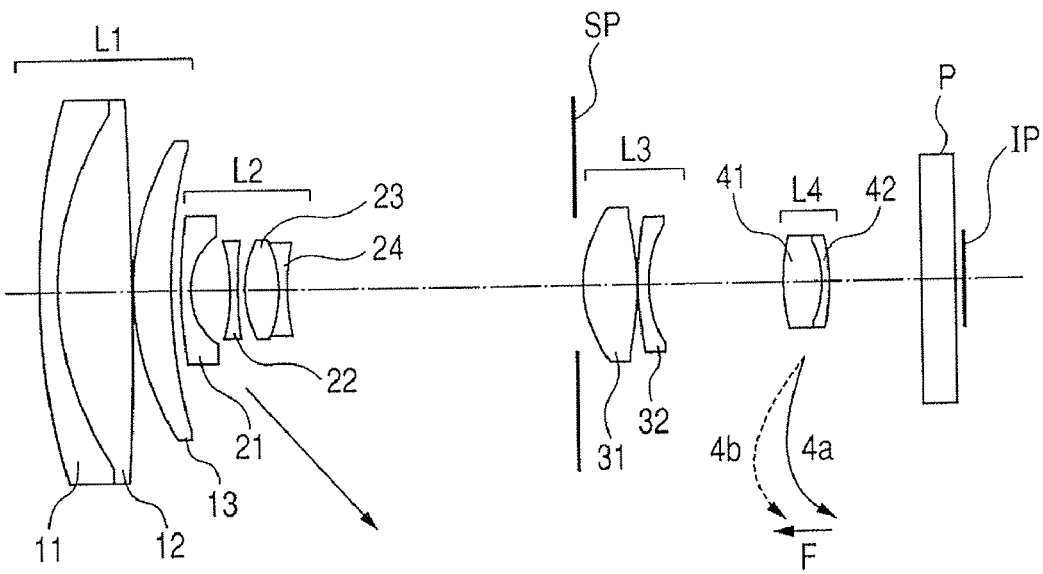
FIG. 13 is a cross sectional view of a zoom lens according to a fourth embodiment of the present invention at the wide angle end.
Figure 14:
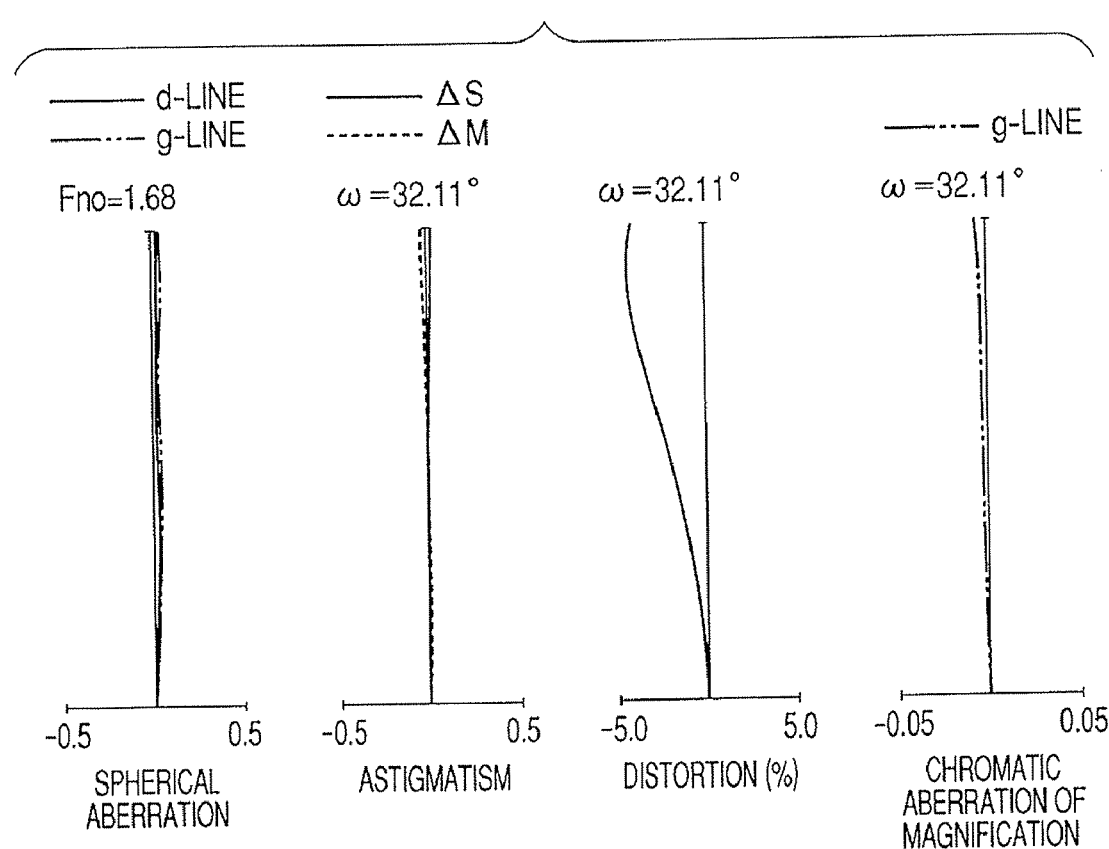
FIGS. 14, 15 and 16 illustrate aberrations of the zoom lens according to the fourth embodiment respectively at the wide angle end, at an intermediate zoom position, and at the telephoto end.
Figure 15:
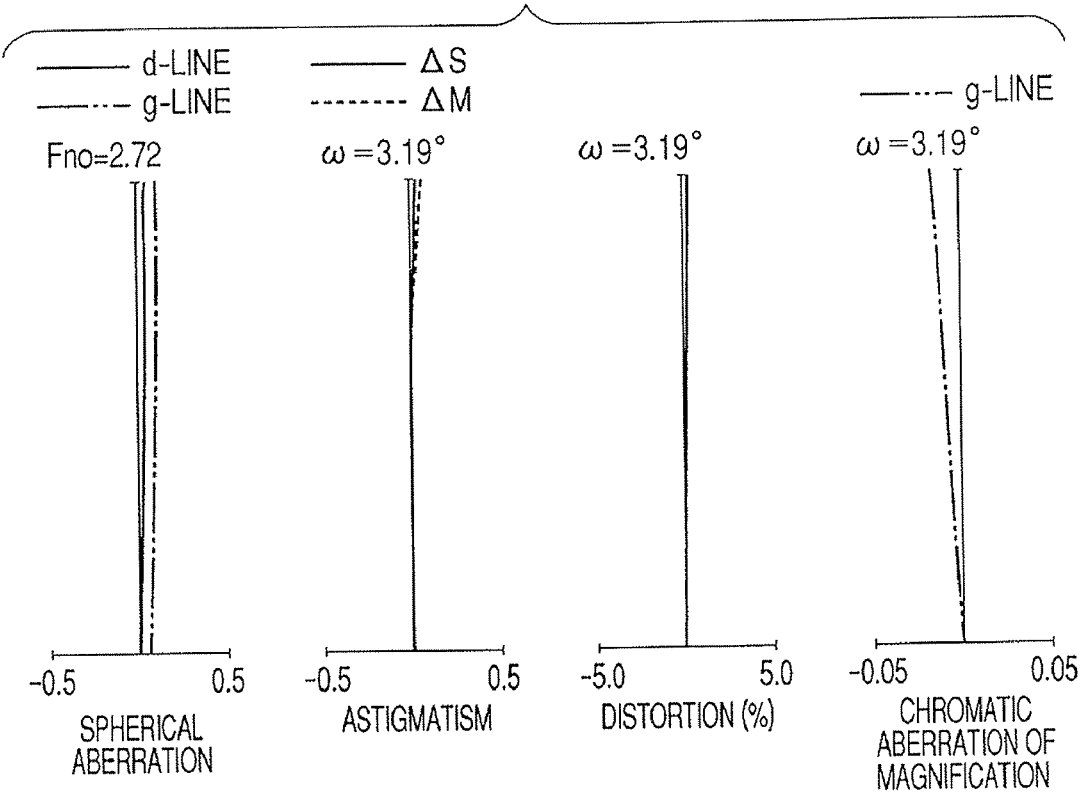
Figure 16:
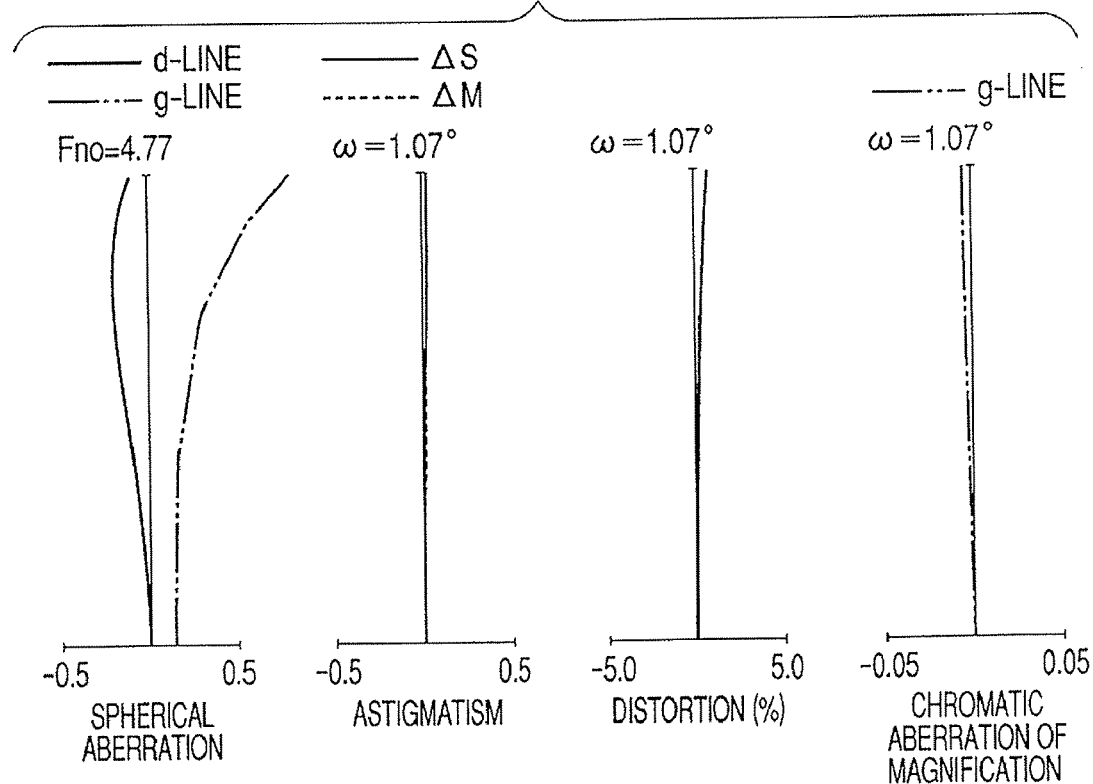
Figure 17:
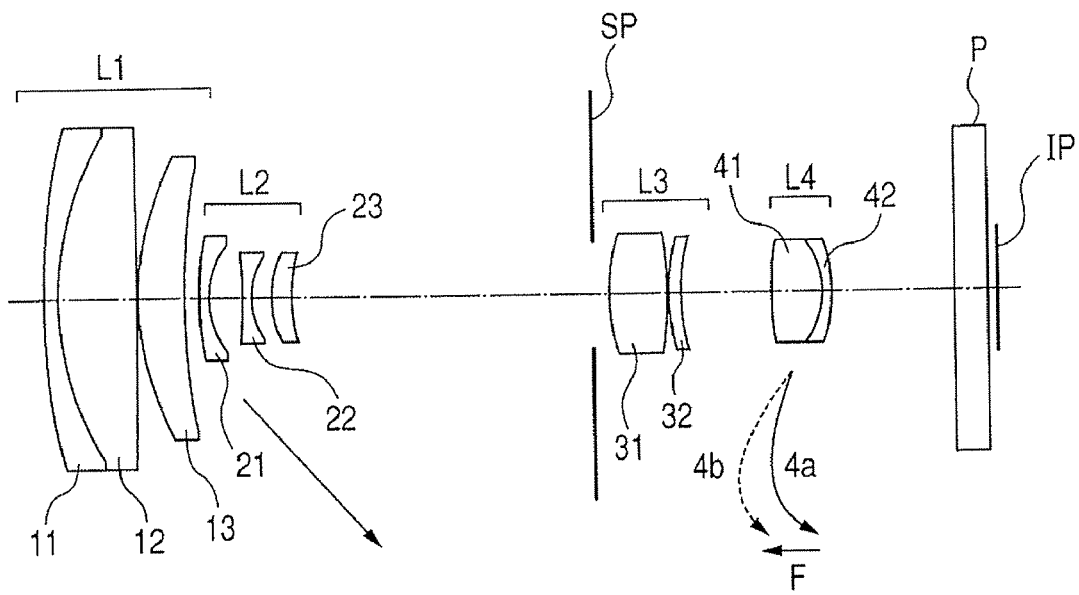
FIG. 17 is a cross sectional view of a zoom lens according to a fifth embodiment of the present invention at the wide angle end.
Figure 18:
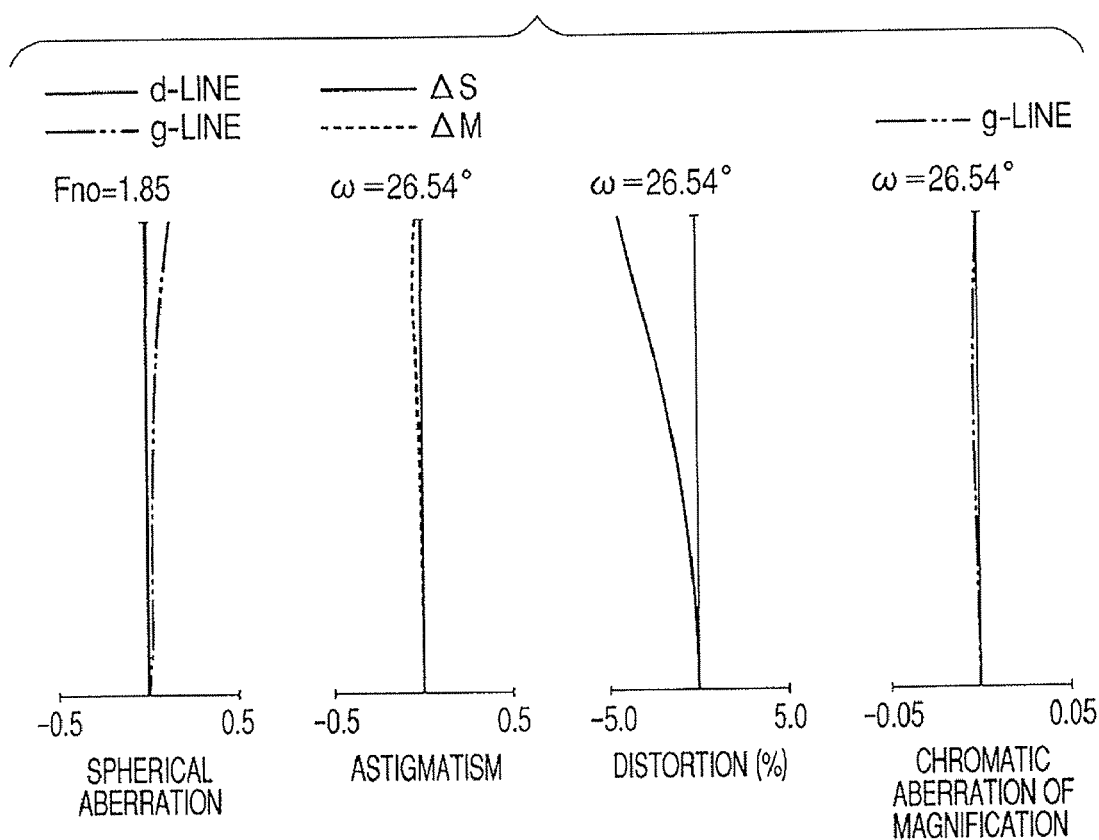
FIGS. 18, 19 and 20 illustrate aberrations of the zoom lens according to the fifth embodiment respectively at the wide angle end, at an intermediate zoom position, and at the telephoto end.
Figure 19:
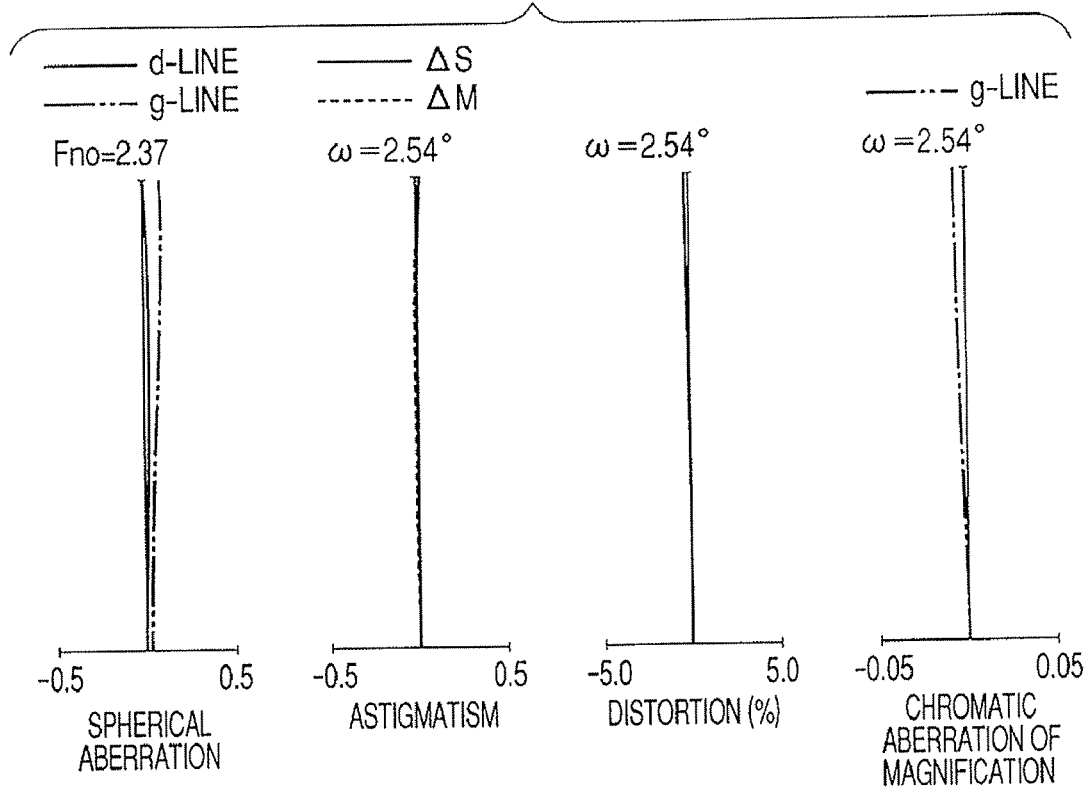
Figure 20:
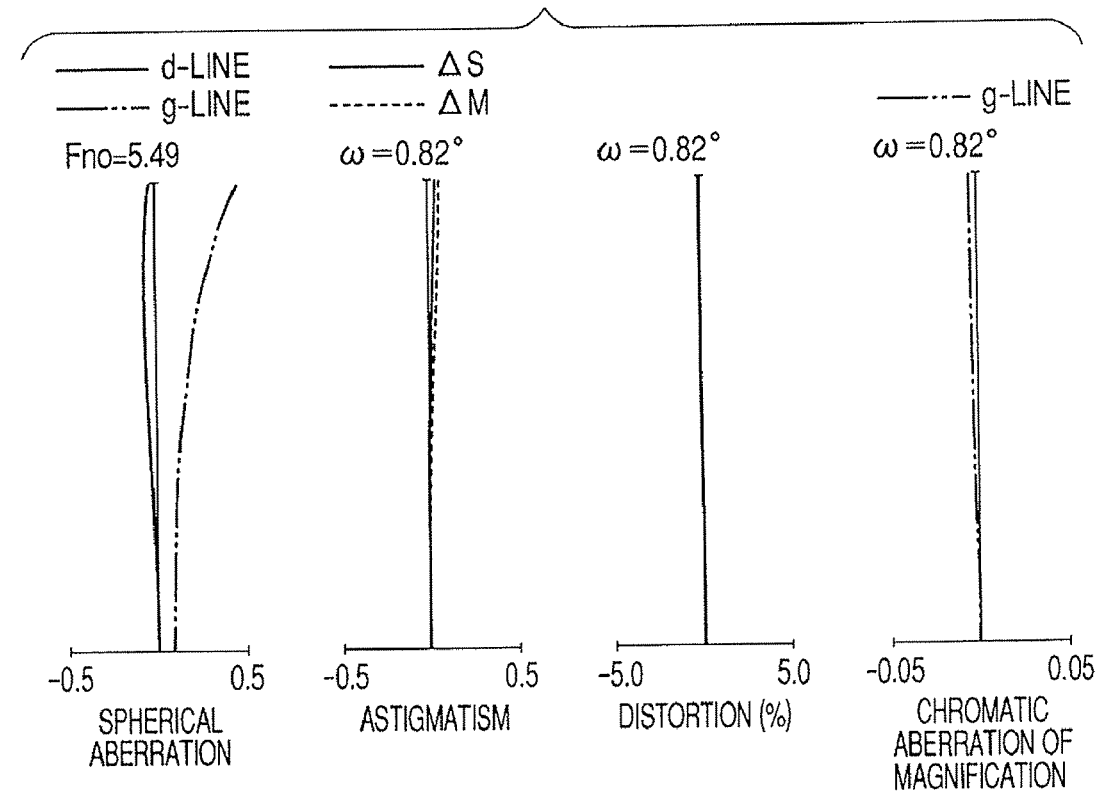
Figure 21:
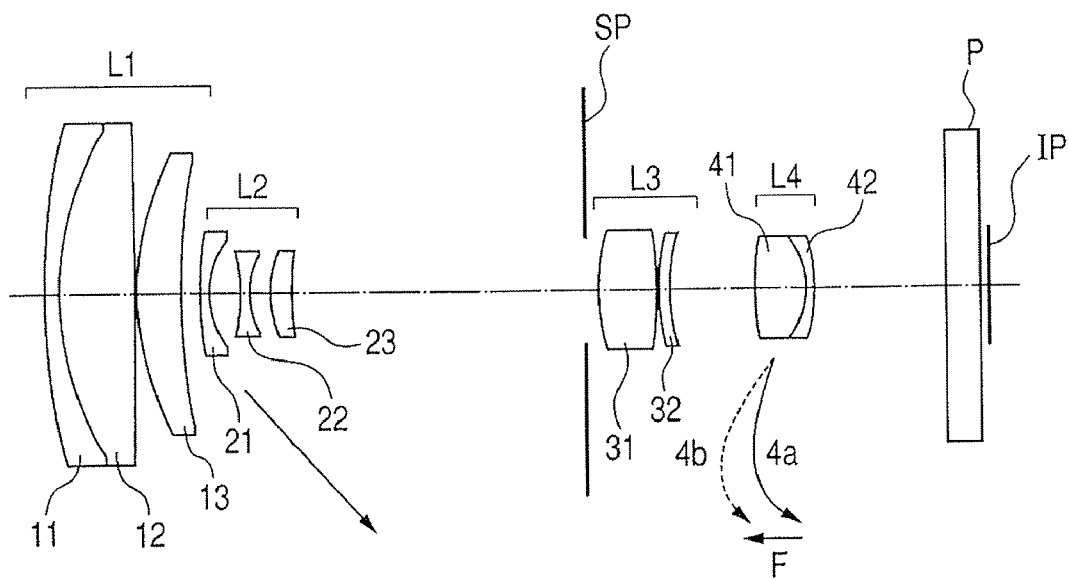
FIG. 21 is a cross sectional view of a zoom lens according to a sixth embodiment of the present invention at the wide angle end.
Figure 22:
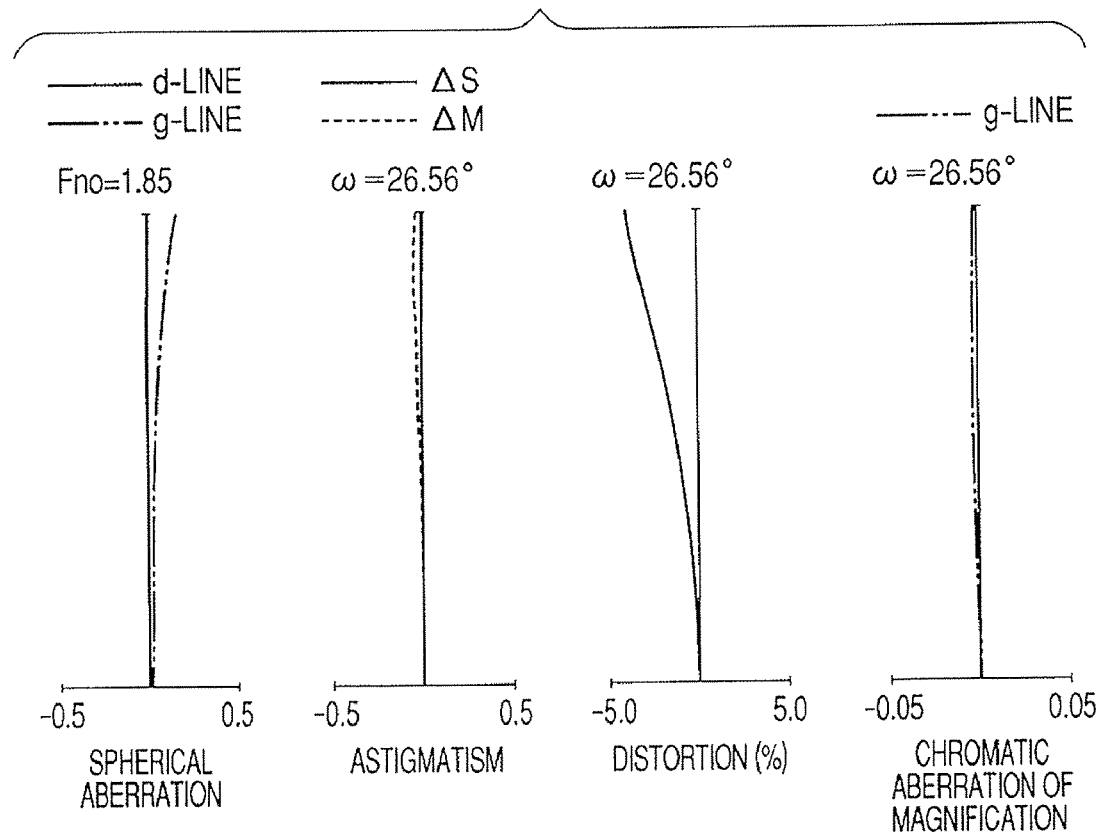
FIGS. 22, 23 and 24 illustrate aberrations of the zoom lens according to the sixth embodiment respectively at the wide angle end, at an intermediate zoom position, and at the telephoto end.
Figure 23:
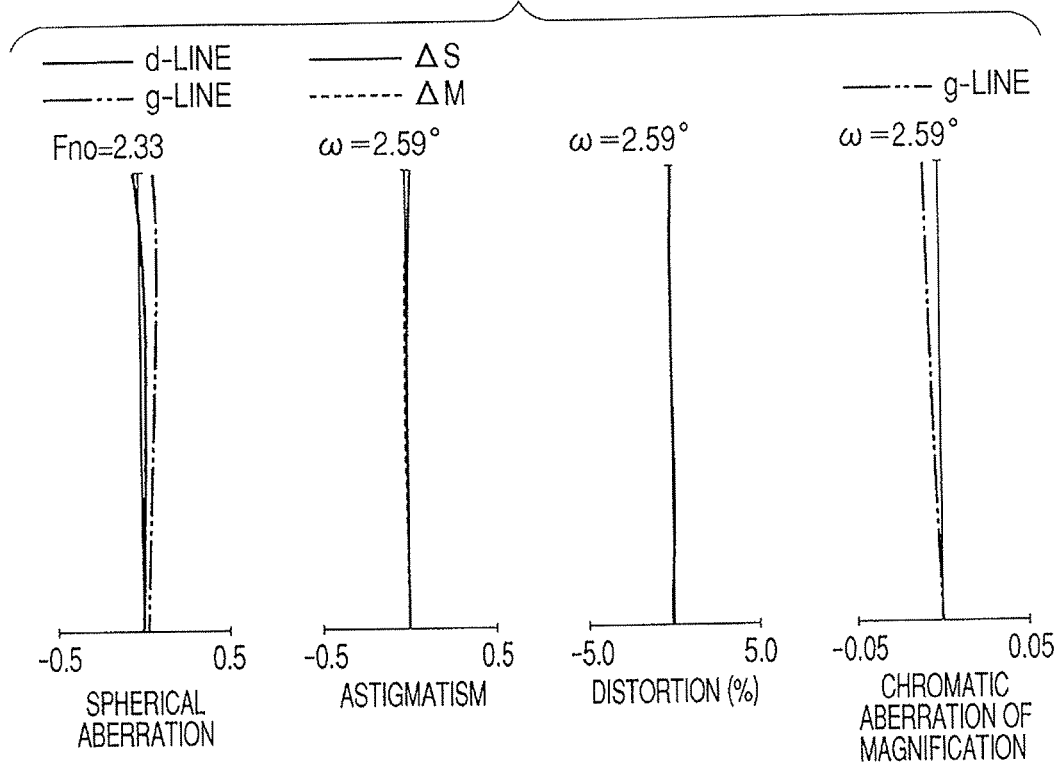
Figure 24:
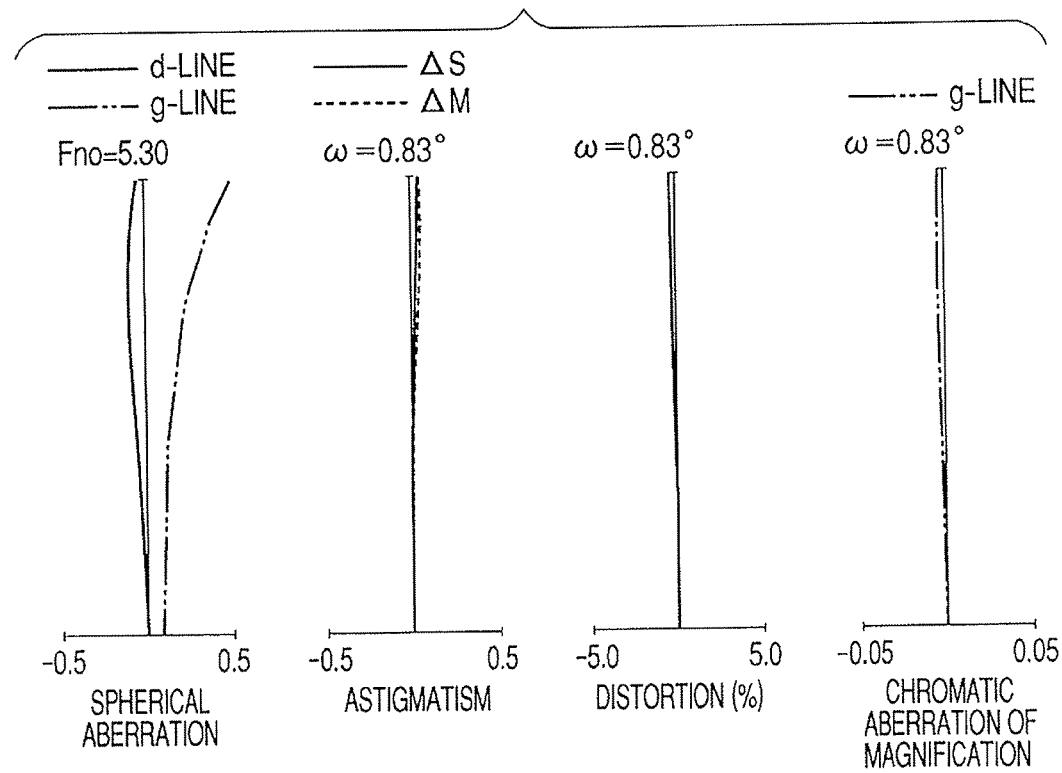
Figure 25:
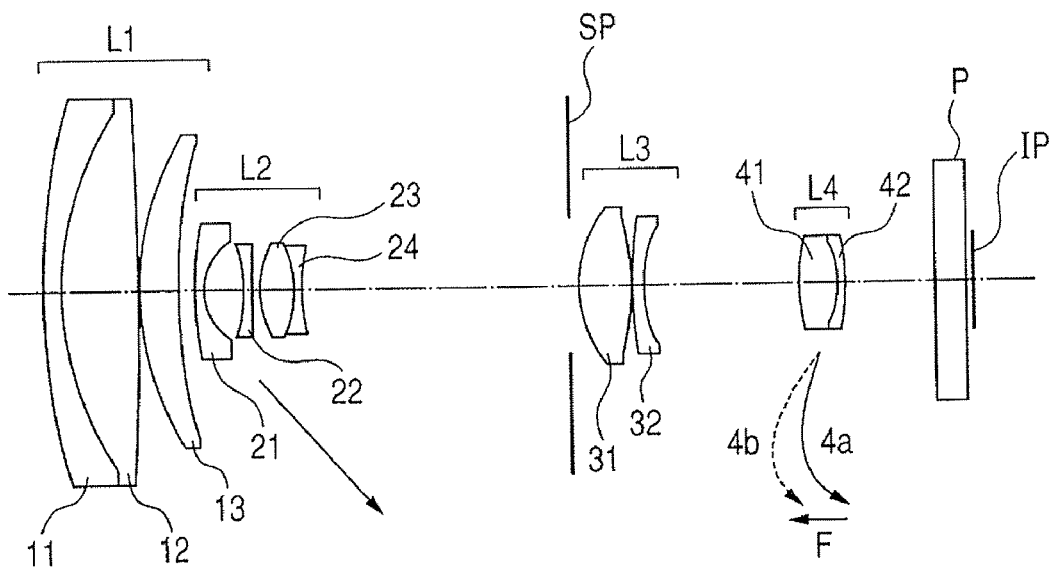
FIG. 25 is a cross sectional view of a zoom lens according to a seventh embodiment of the present invention at the wide angle end.
Figure 26:
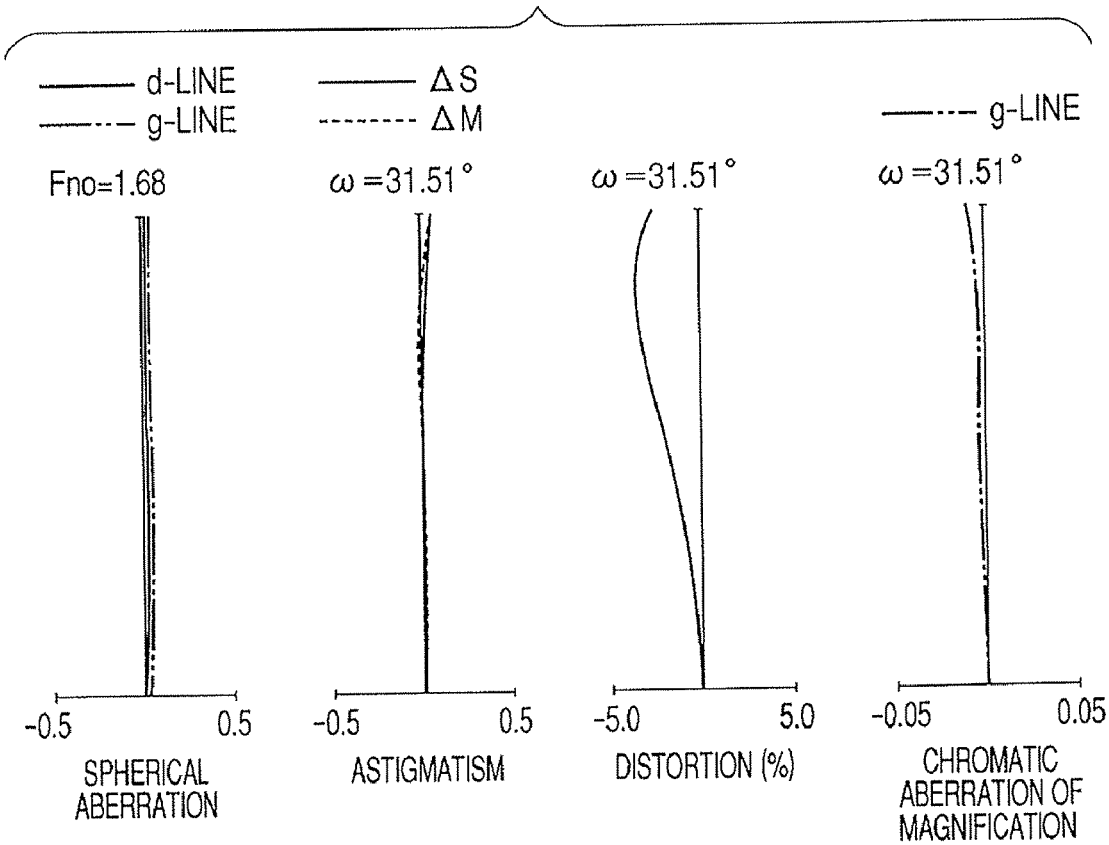
FIGS. 26, 27 and 28 illustrate aberrations of the zoom lens according to the seventh embodiment respectively at the wide angle end, at an intermediate zoom position, and at the telephoto end.
Figure 27:
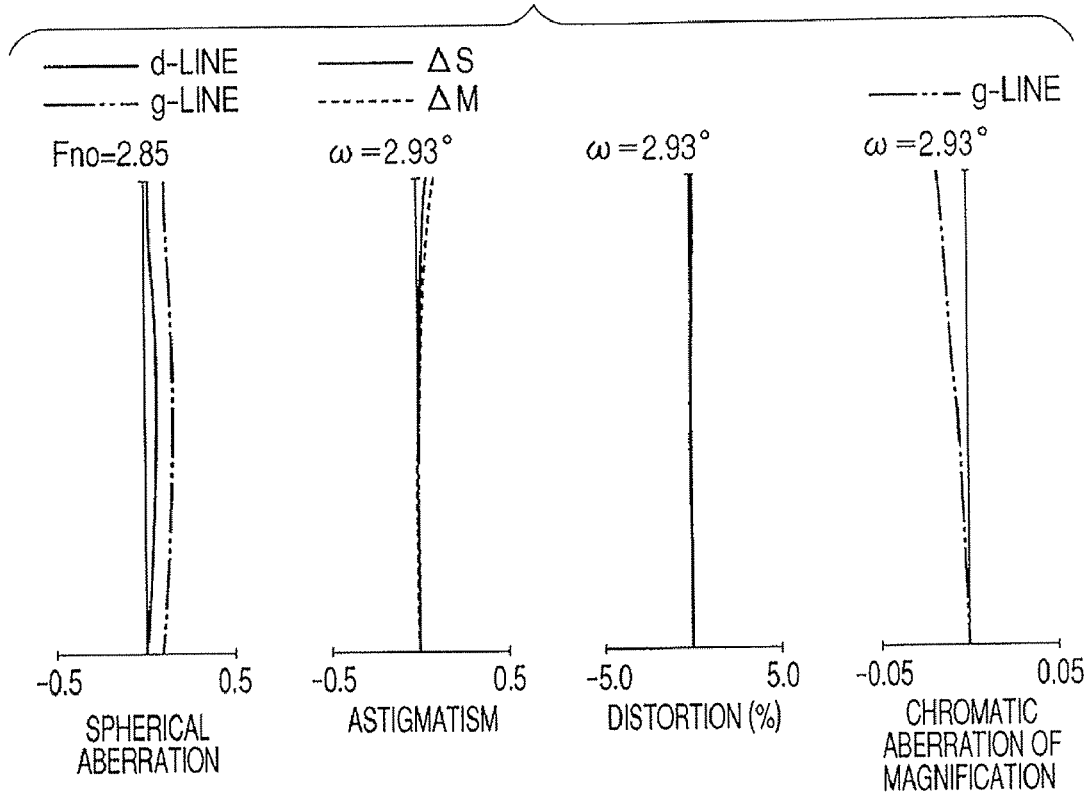
Figure 28:
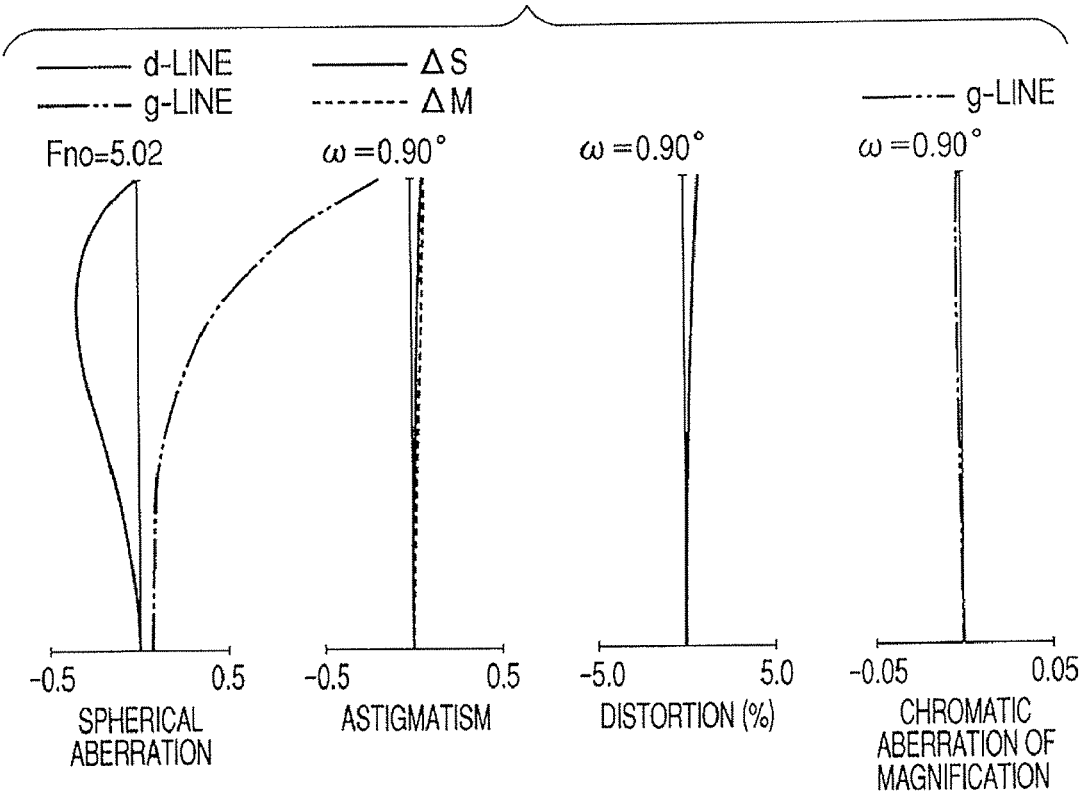

In the second, fifth and sixth embodiments shown in FIGS. 5, 17 and 21, the second lens unit L2 includes a negative lens 21 having a meniscus shape with the concave surface facing the image side, a negative lens 22 having a bi-concave shape, and a positive lens 23.

In the first, third, fourth and seventh embodiments shown in FIGS. 1, 9, 13 and 25, the second lens unit L2 includes a negative lens 21 having a meniscus shape with the concave surface facing the image side, a negative lens 22 having a bi-concave shape, a positive lens 23, and a negative lens 24 having a bi-concave shape. With this configuration, variations of aberrations during zooming are satisfactorily corrected.

The third lens unit L3 includes a positive lens 31 having a bi-convex shape and a negative lens 32 having a meniscus shape with the convex surface facing the object side.

Both surfaces of the positive lens 31 are aspherical.

It is preferable that at least one of these two aspherical surfaces have a refractive power that decreases from the center of the lens toward the outer periphery of the lens.

When an aspherical surface is provided in the third lens unit L3, it is desirable that it is provided as a surface of the object side positive lens 31, since such a configuration is advantageous in correcting aberrations. In particular, axial spherical aberration at the wide angle end can be corrected satisfactorily. When an aspherical surface is provided as the surface closest to the object side in the third lens unit L3, it is desirable that the aspherical surface have a positive refractive power that decreases from the center of the lens toward the outer periphery of the lens.

In all the embodiments, in order 40 to make the entire lens system small, it is important to make the diameter of the light flux sufficiently small by the third lens unit L3 having a positive refractive power.

In zoom lenses of the zoom type same as the embodiments, it is likely that the light emergent from the second lens unit L2 and incident on the third lens unit L3 is divergent light. Accordingly, to decrease the diameter of the light flux from that of the incident light down to a small diameter, the third lens unit L3 is required to have a large positive refractive power.

In view of this, both surfaces of the positive lens 31 in the third lens unit L3 are designed as aspherical surfaces. By this feature, aberrations can be kept to an acceptable level even the refractive power is increased, and the diameter of the emergent light flux can be made small.

Thus, the distance between the third lens unit L3 and the fourth lens unit L4 can be further reduced, and the entire lens system can be made small.

More specifically, the lens system is designed in such a way that divergent light is incident on the object side surface of the positive lens 31 having aspherical surface shapes on both sides, and the incident light is then converged by that lens surface so that convergent light is incident on the image side surface of that positive lens 31. Thus, aberrations are corrected satisfactorily.

The fourth lens unit L4 includes a cemented lens composed of a positive lens 41 and a negative lens 42. The positive lens 41 in the cemented lens has a bi-convex shape, and the negative lens 42 in the cemented lens has a meniscus shape. Thus, variations in chromatic aberration during focusing effected by the fourth lens unit L4 are made small.

The zoom lens according to each embodiment is designed in such a way that at least one of the following conditional expressions is satisfied. Thus, advantageous effects associated with corresponding conditions are achieved.

$$0.15 < |f2|/\sqrt{(fw \times ft)} < 0.27 \tag{1}$$

$$5.40 < f3/fw < 10.00 \tag{2}$$

$$1.85 < n21 < 2.05 \tag{3}$$

$$0.25 < D31/R31 < 0.55 \tag{4}$$

$$1.50 < R32a/R32b < 3.90 \tag{5}$$

$$0.40 < \beta 4T < 0.70 \tag{6}$$

$$0.20 < f1/ft < 0.40 \tag{7}$$

In the above conditional expressions, f1, f2 and f3 are the focal lengths of the first, second and the third lens units L1, L2 and L3 respectively, fw and ft are the focal lengths of the entire lens system (the zoom lens) at the wide angle end and at the telephoto end respectively, n21 is the refractive index of the material of which negative lens 21 is made, R31 is the radius of curvature of the object side surface of positive lens 31, D31 is the thickness of that positive lens 31 at its center, R32a is the radius of curvature of the object side surface of negative lens 32, R32b is the radius of curvature of the image side surface of that negative lens 32, β4T is the lateral magnification of the fourth lens unit L4 in the state in which the zoom lens is focused on an object at infinity at the telephoto end.

Each of the zoom lenses according to the embodiments satisfies at least one of the above conditional expressions.

In the following, technical meaning of each of the above conditional expressions will be discussed. It should be noted that it is not needed essentially for the zoom lens according to the present invention to satisfy all of these conditional expressions, but it is desirable at least one of the conditional expressions. More preferably, it is desirable that conditional expressions (1) and (2) be satisfied. The upper limit values and lower limit values of the above conditional expressions (1) to (7) may be replaced respectively by the upper limit values and the lower limit values of corresponding conditional expressions (1a) to (7a) that will be described later.

The conditional expression (1) is a condition for providing a zoom lens that is small in size and has a high zoom ratio. When the focal length f2 of the second lens unit L2 is so large that the value defined in conditional expression (1) becomes larger than the upper limit value thereof, the optical performance is advantageously enhanced. However, in that case, it is necessary, in order to give a desired zoom ratio, to make the movement amount of the second lens unit L2 large. This disadvantageously leads to an increase in the length of the entire lens system and an increase in the diameter of the lens closest to the object.

On the other hand, when the focal length f2 of the second lens unit L2 is so small that the value defined in conditional expression (1) becomes smaller than the lower limit value thereof, the size of the entire lens system is advantageously made small. However, in that case, the Petzval sum becomes large in the negative direction, and the field curvature becomes so large that it is difficult to achieve satisfactory optical performance.

Conditional expression (2) is a condition for providing a zoom lens that is small and has an excellent optical performance. When the focal length f3 of the third lens unit L3 is so large that the value defined in conditional expression (2) becomes larger than the upper limit value thereof, the positive refractive power that the third lens unit L3 is required to have becomes small. This is advantageous from the viewpoint of aberration correction. However, this leads to an excessively long back focus, and it becomes difficult to make the entire lens system small.

On the other hand, when the focal length f3 of the third lens unit L3 is so small that the value defined in conditional expression (2) becomes smaller than the lower limit value thereof, the positive refractive power that the third lens unit L3 is required to have becomes large, and deterioration in optical characteristics, in particular in spherical aberration will result.

Refractive indices n21 of negative lens 21 that are larger than the upper limit value of conditional expression (3) are advantageous in correcting the field curvature but undesirable, since materials usable in actually making such a lens are limited.

On the other hand, refractive indices n21 of negative lens 21 that are smaller than the lower limit value of conditional expression (3) leads to large Petzval sums that are excessively large in the negative direction, and the field curvature becomes excessively large.

When the thickness of positive lens 31 at its center is so large that the value defined in conditional expression (4) becomes larger than the upper limit value thereof, the volume and the weight of positive lens 31 increase. This leads to an increase in the molding cycle time, in the case where the lens is molded, and is disadvantageous from the viewpoint of lens manufacturing. This is also disadvantageous in reducing the size of the third lens unit L3.

On the other hand, when the thickness of positive lens 31 at its center is so small that the value defined in conditional expression (4) becomes smaller than the lower limit value thereof, the height of oblique ray from the optical axis upon being deflected at the image side surface of that lens becomes low. This prevents satisfactory correction of off-axial coma. In particular, when the image side surface of that lens is aspherical, effects of correcting off-axial coma become small in the peripheral area of the lens in which changes in the curvature accompanied by the aspherical shape are relatively large.

When negative lens 32 has such a shape that the value defined in conditional expression (5) becomes larger than the upper limit value thereof, the position of the rear principal point of the third lens unit L3 is excessively shifted toward the object side, so that the distance between the third lens unit L3 and the fourth lens unit L4 becomes short. Thus, a sufficient space that allows movement of the fourth lens unit L4 during zooming or focusing cannot be provided.

On the other hand, when negative lens 32 has such a shape that the value defined in conditional expression (5) becomes smaller than the lower limit value thereof, it does not functions well in making the position of the rear principal point closer the object side to reduce the size of the lens system. Thus, the length of the entire lens system becomes large.

Conditional expression (6) is a condition for making aberration variations during focusing small and reducing the size of the lens system.

When the lateral magnification of the fourth lens unit L4 becomes larger than the upper limit value of conditional expression (6), the efficiency of movement of the fourth lens unit L4 in focusing becomes low. Accordingly, the movement amount of the fourth lens unit L4 during focusing to an object at a short distance becomes large. This means that the distance between the third lens unit L3 and the fourth lens unit L4 cannot be made shorter, and it is difficult to make the lens system small.

In addiction, large movement amount during focusing disadvantageously leads to large aberration variations during focusing.

On the other hand, when the lateral magnification of the fourth lens unit L4 becomes smaller than the lower limit value of conditional expression (6), the back focus becomes large. This disadvantageously leads to an increase in the length of the entire lens system.

When the focal length of the first lens unit L1 is so large that the value defined in conditional expression (7) becomes larger than the upper limit value thereof, the focal length of the entire lens system becomes large, and it becomes difficult to give a desired focal length range.

On the other hand, when the focal length of the first lens unit L1 is so small that the value defined in conditional expression (7) becomes smaller than the lower limit value thereof, the refractive power that the first lens unit L1 is required to have becomes large. This leads to deterioration in spherical aberration, in particular at the telephoto end.

For all the embodiments, the following modifications to the numerical ranges in the above mentioned conditional expressions (1) to (7) are more desirable.

$$0.170 < |f2|/\sqrt{(fw \times ft)} < 0.260 \tag{1a}$$

$$5.50 < f3/fw < 9.90 \tag{2a}$$

$$1.880 < n21 < 2.020 \tag{3a}$$

$$0.300 < D31/R31 < 0.500 \quad (4a)$$

$$1.60 < R32a/R32b < 3.70 \quad (5a)$$

$$0.45 < \beta 4T < 0.63 \quad (6a)$$

$$0.240 < fl/ft < 0.330 \quad (7a)$$

In each of the embodiments, a lens unit having a small refractive power may be additionally provided on the object side of the first lens unit L1 and/or on the image side of the fourth lens unit L4.

Similarly, a tele conversion lens or a wide conversion lens may be provided on the object side or the image side of the lens system.

As per the above, according to the embodiments of the present invention, it is possible to provide zoom lenses that have excellent optical performance in spite of their smallness in the size of the entire lens system and high zoom ratios.

In addition, it is possible to provide zoom lenses using a rear focus system, having high zoom ratios of 30 to 40 and having excellent optical performance throughout the entire zoom range from the wide angle end to the telephoto end.

Since the first lens unit L1 does not move during zooming, the mechanical structure of the zoom lenses according to the embodiments is simple.

It is possible to provide zoom lenses having excellent optical performance throughout the entire zoom range and having large aperture ratios with F-numbers of 1.68 to 1.8, while having high zoom ratios from 30 to 40.

In the following, numerical embodiments corresponding to the above described embodiments will be presented. In the following tables associated with the numerical embodiments, suffix number i represents the surface number counted from the object side. Thus, Ri represents the radius of curvature of the i-th lens surface (or the i-th surface) and Di represents the distance between the i-th surface and the (i+1)-th surface. Ni represents the refractive index for the d-line and vi represents the Abbe number. In each numerical embodiment, the two surfaces closest to the image side are surfaces of the optical block P.

The aspherical shape is expressed by the following equation in terms of the height h from the optical axis and the displacement (or distance) x in the direction parallel to the optical axis at that height h from the vertex of the aspherical surface as the reference point:

$$X = (h^2/R)/[1 + \{1 - (1+k)(h/R)^2\}^{1/2}] + B'h^5 + C'h^7 + D'h^9 + E'h^{11} + F'h^{13},$$

where k, B', C', D' E' and F' are aspherical coefficients, and R is the paraxial curvature radius.

In the following, the expression "e-Z" stands for "$10^{-Z}$".

Values associated with the above mentioned conditional expressions in the respective numerical embodiments will be presented later in Table 1.

Numerical Embodiment 1

| f | 3.50-112.00 | Fno | 1.68-4.36 | 2ω | 65.5°-2.3° | | |
|---|---|---|---|---|---|---|---|
| R1 | 56.321 | D1 | 1.50 | N1 | 1.846660 | v1 | 23.9 |
| R2 | 26.582 | D2 | 6.20 | N2 | 1.696797 | v2 | 55.5 |
| R3 | −374.018 | D3 | 0.20 | | | | |
| R4 | 23.782 | D4 | 3.15 | N3 | 1.772499 | v3 | 49.6 |
| R5 | 47.054 | D5 | variable | | | | |
| R6 | 22.239 | D6 | 0.75 | N4 | 2.003300 | v4 | 28.3 |

-continued

| f | 3.50-112.00 | Fno | 1.68-4.36 | 2ω | 65.5°-2.3° | | |
|---|---|---|---|---|---|---|---|
| R7 | 5.022 | D7 | 3.91 | | | | |
| R8 | −14.281 | D8 | 0.65 | N5 | 1.882997 | v5 | 40.8 |
| R9 | 102.016 | D9 | 0.20 | | | | |
| R10 | 11.132 | D10 | 2.95 | N6 | 1.846660 | v6 | 23.9 |
| R11 | −11.537 | D11 | 0.08 | | | | |
| R12 | −10.573 | D12 | 0.65 | N7 | 1.729157 | v7 | 54.7 |
| R13 | 19.431 | D13 | variable | | | | |
| R14 | stop | D14 | 0.70 | | | | |
| R15 | 9.201 | D15 | 4.50 | N8 | 1.583126 | v8 | 59.4 |
| R16 | −19.304 | D16 | 0.20 | | | | |
| R17 | 39.696 | D17 | 0.85 | N9 | 1.761821 | v9 | 26.5 |
| R18 | 10.825 | D18 | variable | | | | |
| R19 | 13.587 | D19 | 3.25 | N10 | 1.517417 | v10 | 52.4 |
| R20 | −7.345 | D20 | 0.65 | N11 | 1.846660 | v11 | 23.9 |
| R21 | −13.328 | D21 | variable | | | | |
| R22 | ∞ | D22 | 2.80 | N12 | 1.516800 | v12 | 64.2 |
| R23 | ∞ | | | | | | |

| variable | focal length | | |
|---|---|---|---|
| distance | 3.50 | 38.75 | 112.00 |
| D5 | 0.20 | 21.04 | 12.46 |
| D13 | 26.02 | 5.18 | 13.76 |
| D18 | 9.92 | 2.95 | 5.86 |
| D21 | 7.22 | 14.19 | 11.28 |

Aspherical Coefficient

| R15 | k = −1.00230e+00, B' = 1.07757e−05, C' = −1.13170e−07, D' = 7.24013e−09, E' = −7.41111e−11 |
|---|---|
| R16 | k = −1.17758e+01, B' = 6.34651e−06, C' = 3.18741e−07, D' = −4.71464e−09, E' = 1.12538e−11 |

Numerical Embodiment 2

| f | 2.61-95.02 | Fno | 1.85-5.25 | 2ω | 55.5°-1.6° | | |
|---|---|---|---|---|---|---|---|
| R1 | 45.638 | D1 | 1.00 | N1 | 1.846660 | v1 | 23.9 |
| R2 | 21.043 | D2 | 5.35 | N2 | 1.696797 | v2 | 55.5 |
| R3 | −1169.611 | D3 | 0.20 | | | | |
| R4 | 19.993 | D4 | 2.60 | N3 | 1.772499 | v3 | 49.6 |
| R5 | 44.382 | D5 | variable | | | | |
| R6 | 21.818 | D6 | 0.60 | N4 | 1.882997 | v4 | 40.8 |
| R7 | 5.312 | D7 | 1.85 | | | | |
| R8 | −22.586 | D8 | 0.60 | N5 | 1.772499 | v5 | 49.6 |
| R9 | 5.165 | D9 | 1.04 | | | | |
| R10 | 6.758 | D10 | 1.45 | N6 | 1.922860 | v6 | 18.9 |
| R11 | 14.080 | D11 | variable | | | | |
| R12 | stop | D12 | 0.90 | | | | |
| R13 | 13.082 | D13 | 4.00 | N7 | 1.583126 | v7 | 59.4 |
| R14 | −19.955 | D14 | 0.20 | | | | |
| R15 | 21.446 | D15 | 0.65 | N8 | 1.846660 | v8 | 23.9 |
| R16 | 12.693 | D16 | variable | | | | |
| R17 | 21.916 | D17 | 3.40 | N9 | 1.658441 | v9 | 50.9 |
| R18 | −5.273 | D18 | 0.60 | N10 | 1.846660 | v10 | 23.9 |
| R19 | −9.872 | D19 | variable | | | | |
| R20 | ∞ | D20 | 2.40 | N11 | 1.514000 | v11 | 60.0 |
| R21 | ∞ | | | | | | |

| variable | focal length | | |
|---|---|---|---|
| distance | 2.61 | 29.88 | 95.02 |
| D5 | 0.71 | 17.77 | 10.74 |
| D11 | 21.22 | 4.17 | 11.19 |
| D16 | 7.69 | 3.29 | 5.14 |
| D19 | 7.50 | 11.90 | 10.06 |

Aspherical Coefficient

| R13 | k = 2.05908e+00, B' = −5.25228e−05, C' = −6.53835e−07, D' = 1.04425e−07 |
| R14 | k = −2.53500e+01, B' = −2.12501e−05, C' = −2.54466e−07, D' = 1.12204e−07 |

Numerical Embodiment 3

| f | 3.60-112.50 | Fno | 1.68-4.44 | 2ω | 64.0°-2.3° | | |
|---|---|---|---|---|---|---|---|
| R1 | 61.127 | D1 | 1.50 | N1 | 1.846660 | v1 | 23.9 |
| R2 | 25.536 | D2 | 6.20 | N2 | 1.696797 | v2 | 55.5 |
| R3 | −273.688 | D3 | 0.20 | | | | |
| R4 | 22.963 | D4 | 3.05 | N3 | 1.772499 | v3 | 49.6 |
| R5 | 52.107 | D5 | variable | | | | |
| R6 | 37.197 | D6 | 0.75 | N4 | 1.882997 | v4 | 40.8 |
| R7 | 5.486 | D7 | 3.47 | | | | |
| R8 | −15.898 | D8 | 0.65 | N5 | 1.882997 | v5 | 40.8 |
| R9 | 33.681 | D9 | 0.66 | | | | |
| R10 | 10.745 | D10 | 2.95 | N6 | 1.846660 | v6 | 23.9 |
| R11 | −12.951 | D11 | 0.17 | | | | |
| R12 | −10.573 | D12 | 0.65 | N7 | 1.804000 | v7 | 46.6 |
| R13 | 19.431 | D13 | variable | | | | |
| R14 | Stop | D14 | 0.70 | | | | |
| R15 | 9.052 | D15 | 4.50 | N8 | 1.583126 | v8 | 59.4 |
| R16 | −20.771 | D16 | 0.20 | | | | |
| R17 | 25.746 | D17 | 0.85 | N9 | 1.761821 | v9 | 26.5 |
| R18 | 9.120 | D18 | variable | | | | |
| R19 | 13.623 | D19 | 3.35 | N10 | 1.517417 | v10 | 52.4 |
| R20 | −7.637 | D20 | 0.65 | N11 | 1.846660 | v11 | 23.9 |
| R21 | −13.199 | D21 | variable | | | | |
| R22 | ∞ | D22 | 2.80 | N12 | 1.516800 | v12 | 64.2 |
| R23 | ∞ | | | | | | |

| variable | focal length | | |
|---|---|---|---|
| distance | 3.60 | 39.66 | 112.50 |
| D5 | 0.90 | 19.79 | 12.01 |
| D13 | 24.61 | 5.71 | 13.49 |
| D18 | 11.77 | 3.82 | 7.34 |
| D21 | 8.11 | 16.06 | 12.54 |

Aspherical Coefficient

| R15 | k = −8.47206e−01, B' = −2.11561e−06, C' = 9.81895e−09, D' = 1.65543e−09, E' = −3.20431e−11 |
| R16 | k = −1.49014e+01, B' = −1.77382e−06, C' = 1.94473e−07, D' = 1.58187e−09, E' = −6.92247e−11 |

Numerical Embodiment 4

| f | 3.59-120.00 | Fno | 1.68-4.74 | 2ω | 64.2°-2.1° | | |
|---|---|---|---|---|---|---|---|
| R1 | 60.821 | D1 | 1.50 | N1 | 1.846660 | v1 | 23.9 |
| R2 | 25.485 | D2 | 6.20 | N2 | 1.696797 | v2 | 55.5 |
| R3 | −275.319 | D3 | 0.20 | | | | |
| R4 | 22.950 | D4 | 3.05 | N3 | 1.772499 | v3 | 49.6 |
| R5 | 52.092 | D5 | variable | | | | |
| R6 | 37.071 | D6 | 0.75 | N4 | 1.882997 | v4 | 40.8 |
| R7 | 5.436 | D7 | 3.50 | | | | |
| R8 | −16.302 | D8 | 0.65 | N5 | 1.882997 | v5 | 40.8 |
| R9 | 30.449 | D9 | 0.57 | | | | |
| R10 | 10.631 | D10 | 2.95 | N6 | 1.846660 | v6 | 23.9 |
| R11 | −12.962 | D11 | 0.17 | | | | |
| R12 | −10.505 | D12 | 0.65 | N7 | 1.804000 | v7 | 46.6 |
| R13 | 20.298 | D13 | variable | | | | |
| R14 | stop | D14 | 0.70 | | | | |
| R15 | 9.085 | D15 | 4.50 | N8 | 1.583126 | v8 | 59.4 |
| R16 | −20.539 | D16 | 0.20 | | | | |
| R17 | 25.517 | D17 | 0.85 | N9 | 1.761821 | v9 | 26.5 |
| R18 | 9.112 | D18 | variable | | | | |
| R19 | 13.815 | D19 | 3.18 | N10 | 1.517417 | v10 | 52.4 |
| R20 | −7.656 | D20 | 0.65 | N11 | 1.846660 | v11 | 23.9 |
| R21 | −13.169 | D21 | variable | | | | |
| R22 | ∞ | D22 | 2.80 | N12 | 1.516800 | v12 | 64.2 |
| R23 | ∞ | | | | | | |

| variable | focal length | | |
|---|---|---|---|
| distance | 3.59 | 40.39 | 120.00 |
| D5 | 0.87 | 19.82 | 12.02 |
| D13 | 24.57 | 5.62 | 13.42 |
| D18 | 11.79 | 3.71 | 7.29 |
| D21 | 8.20 | 16.28 | 12.69 |

Aspherical Coefficient

| R15 | k = −9.03299e−01, B' = 2.81609e−07, C' = 3.81204e−8, D' = −4.01923e−10, E' = 1.53663e−11 |
| R16 | k = −1.39531e+01, B' = −5.66388e−07, C' = 1.18648e−07, D' = −5.80130e−10, E' = −4.32554e−12 |

Numerical Embodiment 5

| f | 2.74-95.55 | Fno | 1.85-5.45 | 2ω | 53.1°-1.6° | | |
|---|---|---|---|---|---|---|---|
| R1 | 45.416 | D1 | 1.00 | N1 | 1.846660 | v1 | 23.9 |
| R2 | 20.433 | D2 | 5.00 | N2 | 1.696797 | v2 | 55.5 |
| R3 | −787.092 | D3 | 0.20 | | | | |
| R4 | 19.456 | D4 | 3.00 | N3 | 1.772499 | v3 | 49.6 |
| R5 | 43.947 | D5 | variable | | | | |
| R6 | 16.412 | D6 | 0.60 | N4 | 1.882997 | v4 | 40.8 |
| R7 | 4.973 | D7 | 2.20 | | | | |
| R8 | −9.382 | D8 | 0.60 | N5 | 1.772499 | v5 | 49.6 |
| R9 | 6.380 | D9 | 1.20 | | | | |
| R10 | 9.401 | D10 | 1.45 | N6 | 1.922860 | v6 | 18.9 |
| R11 | 50.580 | D11 | variable | | | | |
| R12 | stop | D12 | 0.91 | | | | |
| R13 | 11.459 | D13 | 4.00 | N7 | 1.583126 | v7 | 59.4 |
| R14 | −24.673 | D14 | 0.20 | | | | |
| R15 | 43.385 | D15 | 0.65 | N8 | 1.846660 | v8 | 23.9 |
| R16 | 16.360 | D16 | variable | | | | |

-continued

| f | 2.74-95.55 | Fno | 1.85-5.45 | 2ω | 53.1°-1.6° | |
|---|---|---|---|---|---|---|
| R17 | 18.029 | D17 | 3.50 | N9 | 1.658441 | v9 50.9 |
| R18 | −5.531 | D18 | 0.60 | N10 | 1.846660 | v10 23.9 |
| R19 | −10.537 | D19 | variable | | | |
| R20 | ∞ | D20 | 2.40 | N11 | 1.514000 | v11 60.0 |
| R21 | ∞ | | | | | |

| variable | focal length | | |
|---|---|---|---|
| distance | 2.74 | 30.86 | 95.55 |
| D5 | 1.01 | 16.85 | 10.32 |
| D11 | 19.64 | 3.80 | 10.32 |
| D16 | 5.84 | 2.17 | 3.48 |
| D19 | 7.94 | 11.61 | 10.30 |

Aspherical Coefficient

| R13 | k = 8.76070e−01, B' = 2.17089e−05, C' = −2.70041e−06, D' = 1.08297e−07, E' = −1.00150e−09 |
| R14 | k = −5.16592e+01, B' = 5.99119e−05, C' = −2.21461e−06, D' = 1.00662e−07, E' = −1.45121e−09 |

Numerical Embodiment 6

| f | 2.74-95.01 | Fno | 1.85-5.25 | 2ω | 53.1°-1.6° | |
|---|---|---|---|---|---|---|
| R1 | 45.849 | D1 | 1.00 | N1 | 1.846660 | v1 23.9 |
| R2 | 20.470 | D2 | 5.00 | N2 | 1.696797 | v2 55.5 |
| R3 | −544.191 | D3 | 0.20 | | | |
| R4 | 19.529 | D4 | 3.00 | N3 | 1.772499 | v3 49.6 |
| R5 | 44.823 | D5 | variable | | | |
| R6 | 16.909 | D6 | 0.60 | N4 | 1.882997 | v4 40.8 |
| R7 | 5.150 | D7 | 2.20 | | | |
| R8 | −10.619 | D8 | 0.60 | N5 | 1.772499 | v5 49.6 |
| R9 | 5.822 | D9 | 1.47 | | | |
| R10 | 8.987 | D10 | 1.45 | N6 | 1.922860 | v6 18.9 |
| R11 | 33.296 | D11 | variable | | | |
| R12 | stop | D12 | 0.91 | | | |
| R13 | 12.762 | D13 | 3.95 | N7 | 1.583126 | v7 59.4 |
| R14 | −32.430 | D14 | 0.20 | | | |
| R15 | 31.400 | D15 | 0.65 | N8 | 1.846660 | v8 23.9 |
| R16 | 14.837 | D16 | variable | | | |
| R17 | 16.880 | D17 | 3.50 | N9 | 1.658441 | v9 50.9 |
| R18 | −5.688 | D18 | 0.60 | N10 | 1.846660 | v10 23.9 |
| R19 | −10.705 | D19 | variable | | | |
| R20 | ∞ | D20 | 2.40 | N11 | 1.514000 | v11 60.0 |
| R21 | ∞ | | | | | |

| variable | focal length | | |
|---|---|---|---|
| distance | 2.74 | 30.30 | 95.01 |
| D5 | 1.20 | 16.69 | 10.31 |
| D11 | 19.96 | 4.48 | 10.85 |
| D16 | 5.82 | 2.51 | 3.60 |
| D19 | 8.90 | 12.20 | 11.12 |

Aspherical Coefficient

| R13 | k = 1.77690e+00, B' = 3.27860e−05, C' = −4.62233e−06, D' = 1.51961e−07, E' = −1.05380e−09 |
| R14 | k = −1.12413e+02, B' = 7.80091e−05, C' = −3.85788e−06, D' = 1.17246e−07, E' = −1.36412e−09 |

Numerical Embodiment 7

| f | 3.67-143.00 | Fno | 1.68-5.00 | 2ω | 63.0°-1.8° | |
|---|---|---|---|---|---|---|
| R1 | 63.484 | D1 | 1.50 | N1 | 1.846660 | v1 23.9 |
| R2 | 26.504 | D2 | 7.00 | N2 | 1.696797 | v2 55.5 |
| R3 | −214.397 | D3 | 0.20 | | | |
| R4 | 22.879 | D4 | 3.50 | N3 | 1.772499 | v3 49.6 |
| R5 | 47.830 | D5 | variable | | | |
| R6 | 39.809 | D6 | 0.75 | N4 | 1.882997 | v4 40.8 |
| R7 | 5.299 | D7 | 3.42 | | | |
| R8 | −15.045 | D8 | 0.65 | N5 | 1.882997 | v5 40.8 |
| R9 | 30.459 | D9 | 0.65 | | | |
| R10 | 10.221 | D10 | 3.05 | N6 | 1.846660 | v6 23.9 |
| R11 | −13.045 | D11 | 0.18 | | | |
| R12 | −10.178 | D12 | 0.65 | N7 | 1.804000 | v7 46.6 |
| R13 | 19.664 | D13 | variable | | | |
| R14 | stop | D14 | 0.70 | | | |
| R15 | 9.091 | D15 | 4.50 | N8 | 1.583126 | v8 59.4 |
| R16 | −19.855 | D16 | 0.20 | | | |
| R17 | 26.027 | D17 | 0.85 | N9 | 1.761821 | v9 26.5 |
| R18 | 9.063 | D18 | variable | | | |
| R19 | 13.221 | D19 | 3.50 | N10 | 1.517417 | v10 52.4 |
| R20 | −7.528 | D20 | 0.65 | N11 | 1.846660 | v11 23.9 |
| R21 | −13.110 | D21 | variable | | | |
| R22 | ∞ | D22 | 2.80 | N12 | 1.516800 | v12 64.2 |
| R23 | ∞ | | | | | |

| variable | focal length | | |
|---|---|---|---|
| distance | 3.67 | 43.95 | 143.00 |
| D5 | 1.41 | 20.31 | 12.53 |
| D13 | 23.73 | 4.83 | 12.62 |
| D18 | 14.01 | 4.34 | 8.97 |
| D21 | 8.06 | 17.73 | 13.10 |

Aspherical Coefficient

| R15 | k = −8.64618e−01, B' = 6.79782e−06, C' = −2.97020e−09, D' = 7.35589e−09, E' = −5.10915e−11 |
| R16 | k = −1.51083e+01, B' = −8.75843e−07, C' = 1.51853r−07, D' = −1.60040e−09, E' = 8.42419e−12, F' = −4.23060e−31 |

TABLE 1

| conditional expression | lower limit value | upper limit value | embodiment 1 | embodiment 2 | embodiment 3 | embodiment 4 | embodiment 5 | embodiment 6 | embodiment 7 |
|---|---|---|---|---|---|---|---|---|---|
| (1) $\lvert f2\rvert/\sqrt{(fw \times ft)}$ | 0.15 | 0.27 | 0.255 | 0.259 | 0.022 | 0.214 | 0.253 | 0.254 | 0.181 |
| (2) $f3/fw$ | 5.40 | 10.00 | 5.647 | 7.802 | 5.703 | 5.704 | 8.022 | 9.852 | 5.577 |
| (3) $n21$ | 1.85 | 2.05 | 2.003 | 1.883 | 1.883 | 1.883 | 1.883 | 1.883 | 1.883 |
| (4) $D31/R31$ | 0.25 | 0.55 | 0.489 | 0.306 | 0.497 | 0.495 | 0.349 | 0.310 | 0.495 |
| (5) $R32a/R32b$ | 1.50 | 3.90 | 3.667 | 1.690 | 2.823 | 2.800 | 2.652 | 2.116 | 2.872 |
| (6) $\beta 4T$ | 0.40 | 0.70 | 0.620 | 0.513 | 0.478 | 0.533 | 0.545 | 0.457 | 0.547 |
| (7) $f1/ft$ | 0.20 | 0.40 | 0.322 | 0.314 | 0.300 | 0.281 | 0.301 | 0.299 | 0.241 |
| fw | — | — | 3.500 | 2.605 | 3.600 | 3.586 | 2.742 | 2.741 | 3.671 |
| ft | — | — | 112.000 | 95.020 | 112.500 | 120.001 | 95.551 | 95.011 | 143.002 |
| f1 | — | — | 36.041 | 29.838 | 33.794 | 33.733 | 28.713 | 28.398 | 34.422 |
| f2 | — | — | −5.047 | −4.077 | −4.468 | −4.442 | −4.096 | −4.096 | −4.149 |
| f3 | — | — | 19.766 | 20.326 | 20.532 | 20.456 | 22.000 | 27.000 | 20.471 |
| D31 | — | — | 4.500 | 4.000 | 4.500 | 4.500 | 4.000 | 3.950 | 4.500 |
| R31 | — | — | 9.201 | 13.082 | 9.052 | 9.085 | 11.459 | 12.762 | 9.091 |
| R32a | — | — | 39.696 | 21.446 | 25.746 | 25.517 | 43.385 | 31.400 | 26.027 |
| R32b | — | — | 10.825 | 12.693 | 9.120 | 9.112 | 16.360 | 14.837 | 9.063 |

In the following, an embodiment of a digital still camera (as an optical apparatus) equipped with a zoom lens according to the present invention as the taking optical system will be described with reference to FIG. 29.

Figure 29:
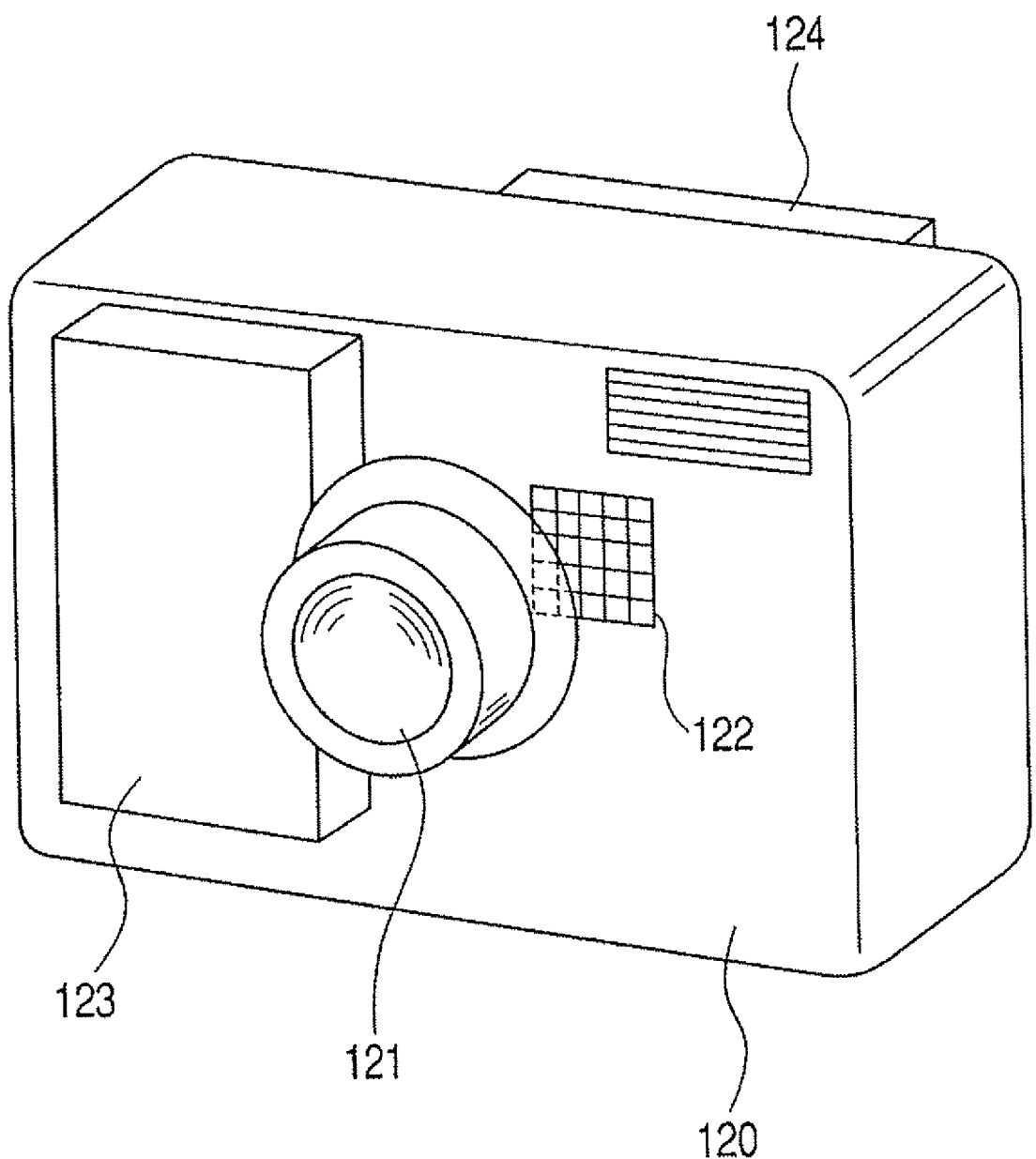
FIG. 29 is a perspective view schematically showing the relevant portions of an digital camera (image pickup apparatus) equipped with a zoom lens according to the present invention.

The camera illustrated in FIG. 29 has a digital camera body 120, a taking optical system 121 constructed as a zoom lens according to any one of the above described embodiments, and an image pickup element 122 such as a CCD sensor that receives an object image formed by the taking optical system 121. The camera also has a recording device 123 for recording the object image received by the image pickup element 122 and a viewfinder 124 that allows the user to view an object image displayed on a display device (not shown).

The display device is, for example, a liquid crystal panel on which the object image formed on the image pickup element 122 is displayed.

The camera may be also provided with a liquid crystal display panel having a function similar to that of the viewfinder.

As per the above, by applying the zoom lens according to the present invention to an optical apparatus such as a digital still camera, an image pickup apparatus that is small in size and has excellent optical performance can be provided.

According to the embodiments described above, compact zoom lenses having high zoom ratios and excellent optical performance throughout the entire zoom range can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-094282, filed Mar. 30, 2006, which is hereby incorporated by reference herein in its entirety.

What is claimed is:

1. A zoom lens comprising, from an object side to an image side:
   a first lens unit having a positive refractive power;
   a second lens unit having a negative refractive power, the second lens unit being moved during zooming;
   a third lens unit having a positive refractive power; and
   a fourth lens unit having a positive refractive power, the fourth lens unit being moved during zooming, wherein the zoom lens satisfies the following conditions:

$$0.15 < \lvert f2\rvert/\sqrt{(fw \times ft)} < 0.27 \text{ and}$$

$$5.40 < f3/fw < 10.00,$$

where f2 and f3 are the focal lengths of the second and third lens units respectively, and fw and ft are the focal lengths of the zoom lens at the wide angle end and at the telephoto end respectively.

2. A zoom lens according to claim 1, wherein the second lens unit comprises, from the object side to the image side, a negative lens having a meniscus shape with the concave surface facing the image side, a negative lens having a bi-concave shape and a positive lens, and the zoom lens satisfies the following condition:

$$1.85 < n21 < 2.05,$$

where n21 is the refractive index of a material of which the negative lens having a meniscus shape is made.

3. A zoom lens according to claim 1, wherein the second lens unit comprises, from the object side to the image side, a negative lens having a meniscus shape with the concave surface facing the image side, a negative lens having a bi-concave shape, a positive lens, and a negative lens having a bi-concave shape, and the zoom lens satisfies the following condition:

$$1.85 < n21 < 2.05,$$

where n21 is the refractive index of a material of which the negative lens having a meniscus shape is made.

4. A zoom lens according to claim 1, wherein the third lens unit comprises, from the object side to the image side, a positive lens 31 having a bi-convex shape, a negative lens 32 having a meniscus shape with the convex surface facing the object side, and the zoom lens satisfies the following condition;

$$0.25 < D31/R31 < 0.55,$$

where R31 is the radius of curvature of the object side surface of that positive lens 31 and D31 is the thickness of that positive lens 31 at its center.

5. A zoom lens according to claim 1, satisfying the following condition:

$$1.50 < R32a/R32b < 3.90,$$

where R32a is the radius of curvature of the object side surface of the aforementioned negative lens 32 and R32b is the radius of curvature of the image side surface of that negative lens 32.

6. A zoom lens according to claim 1, wherein the fourth lens unit is moved during focusing, and the zoom lens satisfies the following condition:

$$0.40 < \beta 4T < 0.70,$$

where β4T is the lateral magnification of the fourth lens unit in the state in which the zoom lens is focused on an object at infinity at the telephoto end.

7. A zoom lens according to claim 1, satisfying the following condition:

$$0.20 < f1/ft < 0.40,$$

where f1 is the focal length of the first lens unit.

8. A zoom lens according to claim 1, wherein the zoom lens forms an image of an object on a solid state image pickup element.

9. An image pickup apparatus comprising:
a solid state image pickup element;
a zoom lens that forms an image on the solid state image pickup element;
wherein the zoom lens includes, from the object side to the image side:
a first lens unit having a positive refractive power;
a second lens unit having a negative refractive power, the second lens unit being moved during zooming;
a third lens unit having a positive refractive power; and
a fourth lens unit having a positive refractive power, the fourth lens unit being moved during zooming, wherein the zoom lens satisfies the following conditions:

$$0.15 < |f2|/\sqrt{(fw \times ft)} < 0.27 \text{ and}$$

$$5.40 < f3/fw < 10.00,$$

where f2 and f3 are focal lengths of the second and third lens units respectively, and fw and ft are the focal lengths of the zoom lens at the wide angle end and at the telephoto end respectively.

* * * * *